United States Patent
Watanabe

(10) Patent No.: US 8,699,549 B2
(45) Date of Patent: Apr. 15, 2014

(54) COMMUNICATION DEVICE, COMMUNICATION SYSTEM, AND COMMUNICATION METHOD

(75) Inventor: Hideaki Watanabe, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 36 days.

(21) Appl. No.: 13/309,904

(22) Filed: Dec. 2, 2011

(65) Prior Publication Data

US 2012/0183021 A1     Jul. 19, 2012

(30) Foreign Application Priority Data

Jan. 13, 2011   (JP) ................. 2011-005017

(51) Int. Cl.
*H04B 1/38* (2006.01)

(52) U.S. Cl.
USPC ............ 375/219; 375/295; 375/316; 710/107

(58) Field of Classification Search
USPC ............................ 375/219, 295, 316; 710/107
See application file for complete search history.

(56) References Cited

U.S. PATENT DOCUMENTS

| | | | | |
|---|---|---|---|---|
| 5,295,178 | A * | 3/1994 | Nickel et al. ................... | 455/561 |
| 6,574,685 | B1 * | 6/2003 | Schwartz et al. ................ | 710/31 |
| 7,656,961 | B2 * | 2/2010 | Vandenameele ............... | 375/267 |
| 7,915,923 | B1 * | 3/2011 | Yeung et al. ...................... | 326/82 |
| 7,961,809 | B2 * | 6/2011 | Bourdoux et al. ............. | 375/295 |
| 2002/0191707 | A1 * | 12/2002 | Lee ................................. | 375/295 |
| 2008/0106651 | A1 * | 5/2008 | Goyal et al. ................... | 348/726 |
| 2009/0085634 | A1 * | 4/2009 | Watanabe et al. ............. | 327/331 |
| 2010/0046600 | A1 * | 2/2010 | Zerbe et al. .................... | 375/233 |
| 2010/0054486 | A1 * | 3/2010 | Sollenberger et al. .......... | 381/55 |
| 2010/0057477 | A1 * | 3/2010 | Kong et al. .................... | 704/502 |
| 2010/0303143 | A1 * | 12/2010 | Takeda ........................... | 375/232 |
| 2011/0004713 | A1 * | 1/2011 | Tsubota ......................... | 710/107 |
| 2011/0299578 | A1 * | 12/2011 | Huang et al. ................... | 375/222 |
| 2012/0207195 | A1 * | 8/2012 | Kawasaki et al. ............. | 375/219 |

FOREIGN PATENT DOCUMENTS

JP      2009-088891     4/2009

\* cited by examiner

*Primary Examiner* — Daniel Washburn
*Assistant Examiner* — Berhanu Tadese
(74) *Attorney, Agent, or Firm* — Sterne, Kessler, Goldstein & Fox P.L.L.C.

(57) ABSTRACT

A communication device includes a transmission circuit that transmits a transmission signal under a certain transmission condition, a reception circuit that receives a reception result of the transmission signal under a certain reception condition and the certain reception condition, and an adjustment circuit that transmits information used to adjust the reception condition based on the reception result and the reception condition from the transmission circuit.

13 Claims, 16 Drawing Sheets

Fig.5A
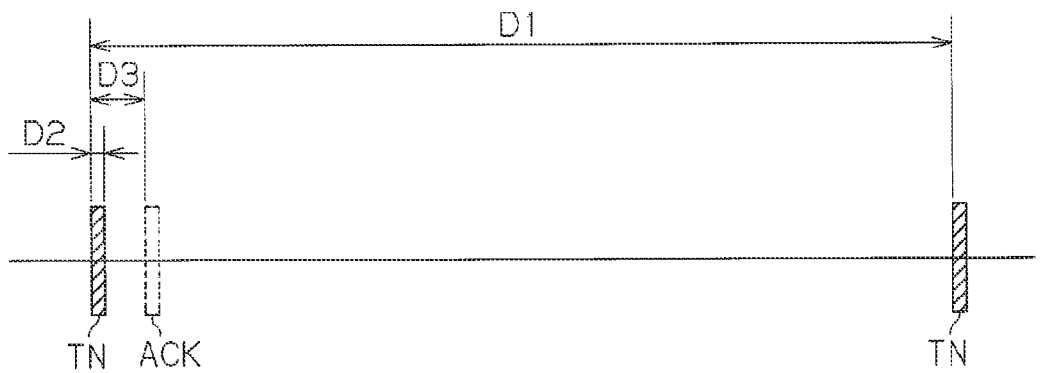
Fig.5B
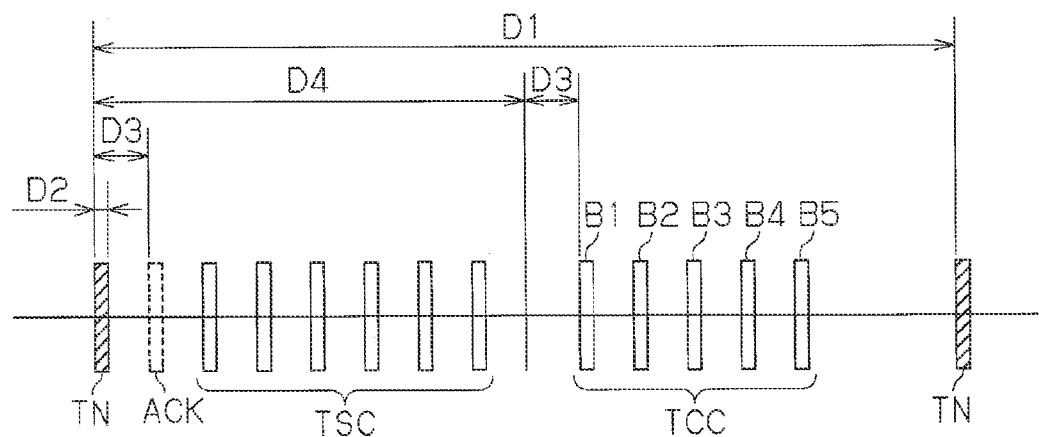
Fig.5C
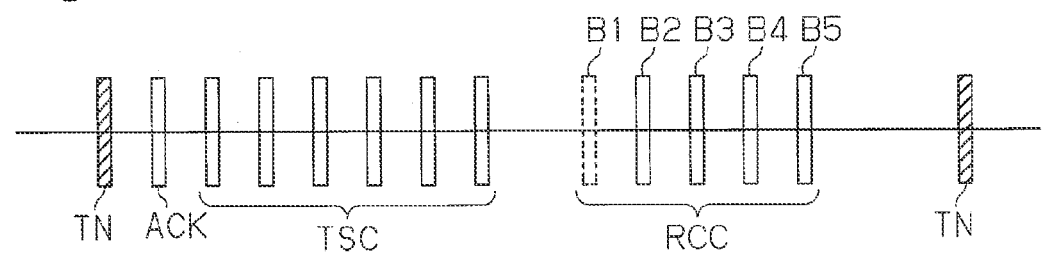
Fig.6A
| B1 | B2 | B3 | B4 | B5 |
|---|---|---|---|---|
| 1 | 1/0 | Transmission Amplitude Value | | DE |
| 0 | X | X | X | EQ |
Fig.6B
| B1 | B2 | B3 | B4 | B5 |
|---|---|---|---|---|
| 0 | Reception Amplitude Value | | | EQ |

COMMUNICATION DEVICE, COMMUNICATION SYSTEM, AND COMMUNICATION METHOD

CROSS-REFERENCE TO RELATED APPLICATIONS

This application is based upon and claims the benefit of priority from prior Japanese Patent Application No. 2011-005017, filed on Jan. 13, 2011, the entire contents of which are incorporated herein by reference.

FIELD

The present embodiment relates to a communication device, a communication system, and a communication method.

BACKGROUND

A network includes a plurality of devices coupled to one another by cables. As disclosed in Japanese Laid-Open Patent Publication No. 2009-88891, devices coupled to a network that complies with the IEEE1394.b standard are operable at one of a plurality of different transfer rate modes.

SUMMARY

Each device of the network includes a transmission-reception circuit designed to stabilize communication even under the worst conditions of the standard. Under a satisfactory signal reception environment, however, the reception circuit, which is designed taking into consideration the worst conditions, consumes unnecessary power.

One aspect of the present embodiment is a communication device including a transmission circuit that transmits a transmission signal under a certain transmission condition. A reception circuit receives a reception result of the transmission signal under a certain reception condition and the certain reception condition. An adjustment circuit transmits, based on the reception result and the reception condition, information used to adjust the reception condition from the transmission circuit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The invention, together with objects and advantages thereof, may best be understood by reference to the following description of the presently preferred embodiments together with the accompanying drawings in which:

FIGS. 5A to 5C are diagrams illustrating transmitted and received signals;
FIGS. 6A and 6B are tables of state codes.

DESCRIPTION OF EMBODIMENTS

First Embodiment

A first embodiment will now be described with reference to FIGS. 1 to 13.

Figure 1:
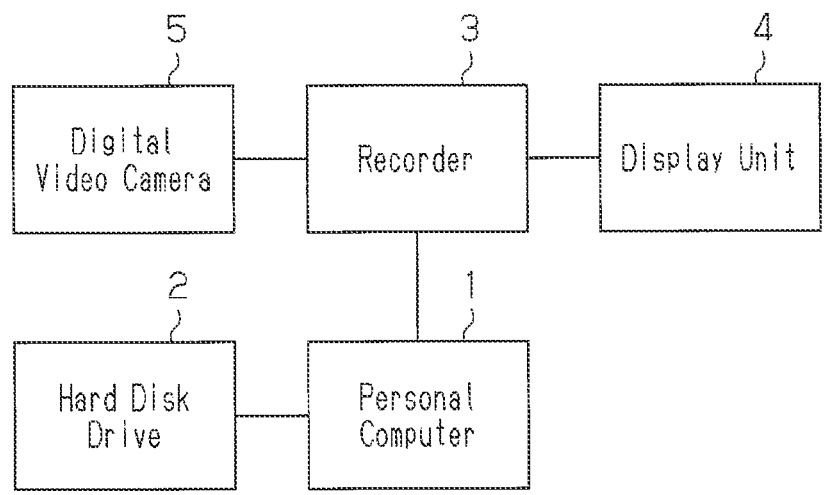
FIG. 1 is a block diagram illustrating a network.

As illustrated in FIG. 1, a network that complies with a certain standard (e.g., the IEEE1394.b standard) includes a plurality of (five shown in FIG. 1) devices communicatively coupled to one another. The devices are, for example, a personal computer 1, a hard disk drive 2, a recorder 3, a display unit 4, and a digital video camera 5. The recorder 3 includes, for example, a hard disk drive (HDD) and an optical disc device (DVD device). The display unit 4 is, for example, a television or a display.

The network is capable of transferring data, such as image data and audio data, for example, between the personal computer 1 and the hard disk drive 2 or between the personal computer 1 and the recorder 3. Data are transferable between the digital video camera 5 and the recorder 3 so that the image data stored in the recorder 3 are transferred to and reproduced on the display unit 4. The image data recorded by the digital video camera 5 may be transferred via the recorder 3 to the display unit 4 for reproduction.

Figure 2:
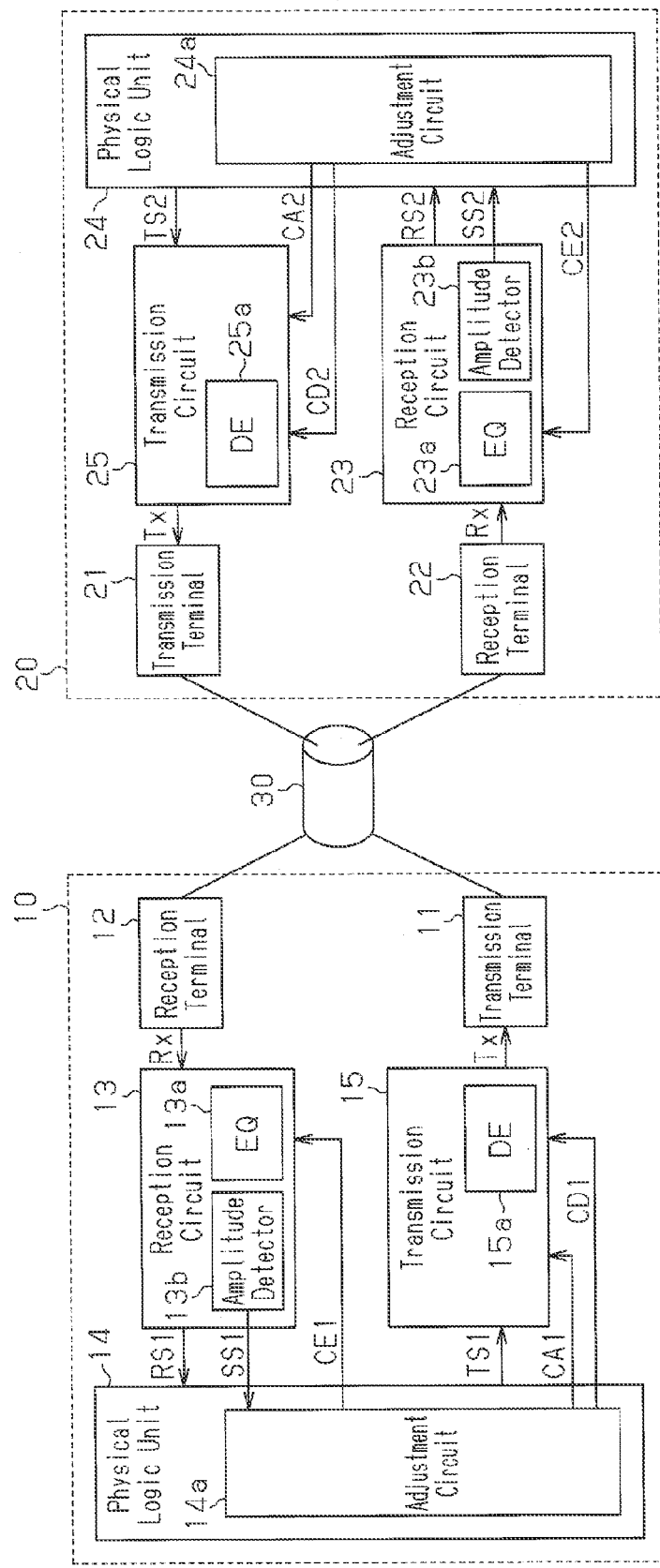
FIG. 2 is a block diagram of a communication device.

The devices each include a communication device. The communication device may be, for example, a semiconductor device. The communication device has a transmission function to transmit transfer data and a reception function to receive transfer data. For example, the personal computer 1 and the hard disk drive 2 each include a communication device 10 and a communication device 20, which are illustrated in FIG. 2. In the present description, the communication devices are referred to as nodes.

The first node 10 includes a transmission terminal 11 and a reception terminal 12. The second node 20 includes a transmission terminal 21 and a reception terminal 22. The transmission terminals 11 and 21 and the reception terminals 12 and 22 have the same terminal resistance. A transmission path 30 couples the transmission terminal 11 and the reception terminal 12 to the reception terminal 22 and the transmission terminal 21 so that bidirectional communication is performable in parallel. The transmission path 30 may be, for example, a plurality of (or pairs of) cables, a conductor (conductor pattern) formed on a substrate, a connector, and the like.

The first node 10 receives a signal Tx (response signal and the like) from the second node 20 and the like in a reception circuit 13 via the reception terminal 12. A received signal Rx from the reception terminal 12 is received by the reception circuit 13. The reception circuit 13 provides a physical logic unit 14 with a received signal RS1 based on a received signal Rx.

The reception circuit 13 includes an equalizer 13a for compensating for a transmission loss between the two nodes. The equalizer 13a is activated and inactivated in response to an equalizer control signal CE1 from the physical logic unit 14. When activated, among the received signals received by the reception circuit 13, the equalizer 13a amplifies those that are in a certain band. The equalizer 13a is one example of an amplification circuit. The reception circuit 13 outputs a received signal RS1 that corresponds to the signal amplified by the equalizer 13a. When inactivated, the equalizer 13a does not perform amplification and the reception circuit 13 outputs a received signal RS1 that has the same amplitude as that of the received signal Rx. The band and amplitude gain processed by the equalizer 13a are set in accordance with, for example, the frequency of the received signal.

The equalizer 13a, when activated, improves the state of communication between the first node 10 and the second node 20. For example, the amplification of a signal in a certain band by the equalizer 13a compensates for a high-frequency component of a data waveform lost in the transmission path 30. A relatively large high-frequency loss in the transmission path 30 deteriorates the data waveform at a reception terminal and hinders stable transmission and reception of data. Accordingly, the equalizer 13a reduces deteriorations in data waveform to enable stable data transmission and reception. When the loss in a transmission path is small, the deterioration of a data waveform is small and stable data transmission and reception are performable even through the equalizer 13a does not operate.

Activation and inactivation of the equalizer 13a varies the power consumed by the reception circuit 13. When the equalizer 13a is activated, the reception circuit 13 consumes more power than that when the equalizer 13a is inactivated. Therefore, inactivating the equalizer 13a reduces the power consumed by the reception circuit 13.

The reception circuit 13 includes an amplitude detector 13b that detects the amplitude of a received signal. The amplitude detector 13b detects the amplitude of a received signal at the reception terminal 12 and outputs the detection result, that is, an amplitude value SS1. One example of the received signal of which amplitude is detected by the amplitude detector 13b is the output signal of the equalizer 13a. The received signal to be detected by the amplitude detector 13b only needs to be a signal of which amplitude varies when the amplitude of a transmission signal from a peer node varies. Accordingly, the received signal to be detected by the amplitude detector 13b may be changed to the signal received by the reception circuit 13 or the equalizer 13a.

The physical logic unit 14 receives the received signal RS1 output from the reception circuit 13 and encodes this received signal RS1 into reception data. Further, the physical logic unit 14 provides a transmission circuit 15 with a transmission signal TS1 based on transmission data. The transmission circuit 15 outputs a signal Tx based on the transmission signal TS1.

The transmission circuit 15 includes a de-emphasis circuit 15a that compensates for inter-signal interference caused by a loss in the transmission path. The de-emphasis circuit 15a is activated and inactivated in response to a control signal CD1 from the physical logic unit 14. When activated, the de-emphasis circuit 15a emphasizes a transmission side signal. For example, the de-emphasis circuit 15a shapes a rectangular signal into a waveform in which at least one of its leading edge and trailing edge is overshot. The de-emphasis circuit 15a is one example of a waveform shaping circuit. The de-emphasis circuit may also be referred to as a pre-emphasis or post-emphasis.

The de-emphasis circuit 15a, when activated, improves the communication state between the first node 10 and the second node 20. For example, when the de-emphasis circuit 15a shapes a waveform of a signal, a high-frequency component of the data waveform lost in the transmission path 30 is emphasized. A relatively large high-frequency loss in the transmission path 30 deteriorates the data waveform at the reception terminal. This prevents stable transmission and reception of data. Accordingly, the de-emphasis circuit 15a reduces data waveform deteriorations to enable stable data transmission and reception. When the transmission path has a small loss, the data waveform deterioration is small. Thus, stable data transmission and reception are performable even when the de-emphasis circuit 15a does not operate.

When the de-emphasis circuit 15a is activated and inactivated, the power consumed by the transmission circuit 15 varies. When the de-emphasis circuit 15a is activated, the transmission circuit 15 consumes more power than when the de-emphasis circuit 15a is inactivated. Thus, inactivating the de-emphasis circuit 15a reduces the power consumption of the transmission circuit 15.

The transmission circuit 15 transmits the transmission signal Tx based on the output signal of the de-emphasis circuit 15a. Moreover, the transmission circuit 15 transmits the transmission signal Tx having amplitude that corresponds to an amplitude control signal CA1. The signal of which amplitude is to be adjusted only needs to be a signal somewhere between an input terminal and an output terminal of the transmission circuit 15, for example, a signal to be supplied to the de-emphasis circuit 15a. The signal Tx output from the transmission circuit 15 is supplied to the second node 20 via the transmission terminal 11 and the transmission path 30.

The second node 20 has the same configuration as the first node 10. More specifically, the second node 20 includes a reception circuit 23, a physical logic unit 24, and a transmission circuit 25. The circuits in the second node 20 operate in the same manner as the circuits in the first node 10. That is, the reception circuit 23 provides the physical logic unit 24 with a received signal RS2 based on a signal Rx received via the reception terminal 22. The physical logic unit 24 receives the received signal RS2 from the reception circuit 23 and encodes the received signal RS2 into reception data. Further, the physical logic unit 24 provides the transmission circuit 25 with a transmission signal TS2 based on transmission data. The transmission circuit 25 outputs a signal Tx based on the transmission signal TS2.

The reception circuit 23 includes an equalizer 23a, which compensates for a transmission loss between the two nodes, and an amplitude detector 23b, which detects the amplitude of a signal at the reception terminal 22. The equalizer 23a is activated and inactivated in response to a control signal CE2 output from the physical logic unit 24. The amplitude detector 23b outputs a detected amplitude value SS2 to the physical logic unit 24. The transmission circuit 25 includes a de-emphasis circuit 25a that compensates for inter-signal interference caused by a loss in the transmission path. The de-emphasis circuit 25a is activated and inactivated in response to a control signal CD2 output from the physical logic unit 24.

The physical logic unit 14 in the first node 10 includes an adjustment circuit 14a that manages operation conditions of the reception circuit 13 and the transmission circuit 15. In the same manner, the physical logic unit 24 in the second node 20 includes an adjustment circuit 24a that manages operation conditions of the reception circuit 23 and the transmission circuit 25.

The adjustment circuits 14a and 24a communicate with each other based on the operation conditions. The adjustment circuit 14a generates control signals CE1, CA1, CD1, and the like for the reception circuit 13 and the transmission circuit 15 to adjust the reception circuit 13 and the transmission circuit 15. In the same manner, the adjustment circuit 24a generates the control signal CE2 for the equalizer 23a in the reception circuit 23 and control signals CA2 and CD2 for the transmission circuit 25 to adjust the reception circuit 23 and the transmission circuit 25.

The communication performed between the first node 10 and the second node 20 is full duplex communication that allows simultaneous transmission and reception between the nodes 10 and 20. Thus, mutual communication between the first node 10 and the second node 20 is performed through two paths. The first path permits the transmission of a signal from the transmission circuit 15 in the first node 10 to the reception circuit 23 in the second node 20. The second path permits the transmission of a signal from the transmission circuit 25 in the second node 20 to the reception circuit 13 in the first node 10.

The state (level, waveform, and the like) of a received signal in the reception circuit 13 of the first node 10 corresponds to the state of a transmission signal from the transmission circuit 25 of the second node 20, that is, the transmission conditions of the transmission circuit 25. Thus, the adjustment circuits 14a and 24a of the nodes 10 and 20 respectively adjust the transmission circuit 15 and reception circuit 23 based on a signal transmitted through the first path.

In the same manner, the state (level, waveform, and the like) of a received signal in the reception circuit 23 of the second node 20 corresponds to the state of a transmission signal from the transmission circuit 15 of the first node 10, that is, the transmission conditions of the transmission circuit 25. Thus, the adjustment circuits 14a and 24a respectively adjust the transmission circuit 15 and reception circuit 23 based on a signal transmitted through the second path.

The state transitions in the nodes 10 and 20 will now be described.

Figure 4:
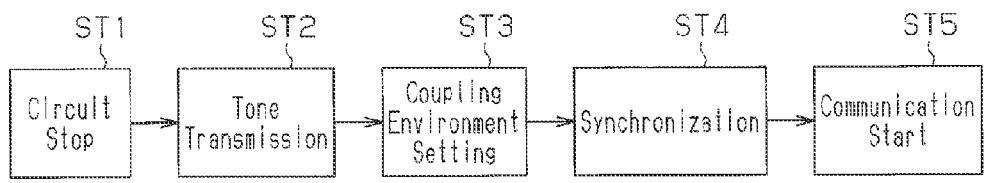
FIG. 4 is a diagram illustrating state transition.

Referring to FIG. 4, the nodes 10 and 20 each shift from a first state ST1 to a fifth state ST5. The states ST1 to ST5 in FIG. 4 schematically show a circuit-stopped state to a communication start state although the nodes 10 and 20 are not limited to such states.

The first state ST1 is the circuit-stopped state. When the power goes on, the nodes 10 and 20 each shift from the first state ST1 to the second state ST2.

The second state ST2 is a tone transmission state, in which the nodes 10 and 20 each cyclically transmit a signal referred to as a "tone signal" from the transmission circuit 15. If a cable is coupled and a tone signal from another node coupled is received, the second state ST2 shifts to the third state ST3.

In the third state ST3, a communication environment setting is executed. Each of the nodes 10 and 20 sets a communication environment with the peer node of which coupling has been confirmed. The communication environment includes the speed of communication between nodes. The nodes 10 and 20 each transmit a transmission signal including information (speed code) corresponding to communication speed of the node to match the communication speeds of the nodes 10 and 20.

The communication environment also includes the operation conditions for the transmission circuit and the reception circuit in each of the nodes 10 and 20. Each of the nodes 10 and 20 transmits a transmission signal including setting conditions for the transmission circuit and the reception circuit. The setting conditions include an amplitude value of the output signal, an operation state of the circuit related to a transmission waveform quality (for example, the de-emphasis circuit), an operation state of the circuit related to signal reception sensitivity (e.g., the equalizer), and the like. Then, the nodes 10 and 20 each transmit a signal including response information based on the received signal. The nodes 10 and 20 each adjust the transmission circuit and the reception circuit based on the setting conditions and the response information.

The fourth state ST4 is a synchronization state, in which the reception circuit is synchronized with the received signal based on a synchronization signal. When synchronization is established, the nodes 10 and 20 each shift from the fourth state ST4 to the fifth state ST5. In the fifth state ST5, each of the nodes 10 and 20 communicates with a peer node of which coupling has been established.

Signals transmitted and received between the nodes 10 and 20 will now be described.

As illustrated in FIG. 5A, a tone signal TN is repeatedly transmitted in intervals of a certain time D1. The transmission interval (D1), or cycle, of the tone signal TN is set by the standard and is, for example, 42.67 ms. The tone signal TN includes pulses that have a frequency (for example, 48 MHz to 64 MHz) corresponding to the standard and continue during time D2 (for example, 666.67 μs).

When coupled to each other by the transmission path 30 illustrated in FIG. 2, each of the first node 10 and second node 20 detects a tone signal TN transmitted from the other node and transmits a signal in response. As illustrated in FIG. 5A, the response signal is a receipt notification signal (acknowledgement signal) ACK, which is indicated by a broken line. The receipt notification signal ACK is transmitted when a certain time D3 (for example, 2.67 ms) elapses from initiation of the tone signal TN. The receipt notification signal ACK is a pulse signal like the tone signal TN. When the first node 10 and the second node 20 each detected the receipt notification signal ACK, the first and second nodes 10 and 20 determine that the peer node has been coupled and shift from the second state ST2 to the third state ST3, as illustrated in FIG. 4.

Referring to FIG. 5B, subsequent to transmission of the tone signal TN, the first node 10 and the second node 20 shifted to in the third state ST3 each transmit a speed code TSC within a certain time D4 (for example, 21.33 ms). The speed code TSC is a signal including of a certain number of bits (for example, six bits). As illustrated in FIG. 5B, the timing at which the acknowledgement signal ACK is transmitted is reserved. Bits of the speed code TSC are successively transmitted in intervals of time D3 from when time D3 elapses from the transmission of the acknowledgement signal ACK.

In the same manner as the tone signal TN, each bit of the speed code TSC is represented by a pulse signal that is output over time D2. For example, a bit for the value of "1" is represented by the output of a pulse signal over time D2, and a bit for the value "0" is represented by stopping the output of a pulse signal over time D2. Accordingly, a reception side circuit (e.g., the physical logic unit 24 in the second node 20) sets "1" as the value for a bit corresponding to a pulse signal detected at a certain timing and sets "0" as the value for a bit if a pulse signal is not detected.

Each of the nodes 10 and 20 transmits to the other one the speed code TSC that corresponds to the maximum communication speed under which communication is performable. For example, a node applicable to operation modes of S400, S800, S1600, and S3200 of IEEE1394.b standard transmits a speed code TSC with a bit string of "011XX0" that corresponds to mode S3200. Here, "XX" are bits that correspond to "FOP Capable" and "PIL Capable".

A node that receives the speed code TSC transmits the tone signal TN and the acknowledgement signal ACK and then transmits the speed code TSC that corresponds to the operation mode to which it is applicable. The nodes 10 and 20 both transmit a transmission signal including information (speed code TSC) that correspond to its communication speeds. Then, the nodes 10 and 20 exchange their maximum communication speeds and set the operation mode corresponding to the lower one of the communication speeds.

For example, in a case in which the first node 10 is operable in operation modes S400, S800, S1600, and S3200, and the second node 20 is operable in operation modes S200, S400, S800, and S1600, the first node 10 transmits the speed code TSC that corresponds to operation mode S3200, while the second node 20 transmits the speed code TSC that corresponds to operation mode S1600.

When receiving the speed code TSC that corresponds to operation mode S1600, the first node 10, which is operable in this operation mode, transmits the tone signal TN, the acknowledgement signal ACK, and then the speed code TSC that corresponds to operation mode S1600. The second node 20, which has received the speed code TSC that corresponds to the operation mode S3200, is not operable in this operation mode. Thus, after transmitting the acknowledgement signal ACK, the second node 20 transmits the speed code TSC for the operation mode that corresponds to the maximum communication speed of the second node 20 in which communication is performable, that is, the operation mode S1600.

The nodes 10 and 20 transmit the circuit operation state information (state codes) to set the operation conditions for the transmission circuit and the reception circuit.

As described above, communication between the first node 10 and the second node 20 is performed through the two paths. The signal Tx transmitted from a transmission circuit along in each path is received as the received signal Rx via the transmission path 30 by a reception circuit. That is, one of two nodes coupled by the transmission path operates as a transmission-side node and the other operates as a reception-side node. Thus, the transmission-side node transmits a state code TCC illustrated in FIG. 5B. The reception-side node transmits a state code RCC illustrated in FIG. 5C.

The state codes TCC and RCC are signals each including a certain number of (for example, five) bits. In the same manner as the tone signal TN and the speed code TSC, each bit of the state codes TCC and RCC is represented by whether or not a pulse signal is output over time D2.

The nodes 10 and 20 transmit the state code TCC or RCC in accordance with their operation states. For example, when the first node 10 is the transmission side and the second node 20 is the reception side, as illustrated in FIG. 5B, the first node 10 transmits the state code TCC between the speed code TSC and the next tone signal TN. When the certain time D4 elapses after time D3 has already elapsed since the initiation of the transmission of the tone signal TN, the first node 10 transmits the bits of the state code TCC in intervals of time D3. In the same manner, as illustrated in FIG. 5C, the second node 20 transmits the state code RCC between the speed code TSC and the next tone signal TN.

In this manner, after a period that is two times longer than the certain time D3 elapses from when the transmission of the last bit of the speed code TSC is initiated, the nodes 10 and 20 start transmitting the state codes TCC and RCC. In this manner, the insertion of an interval between the last bit of the speed code TSC and the first bit of the state code TCC allows the speed code TSC to be distinguished from the state codes TCC and RCC when received. Further, a device that is not applicable to the transmission of the state codes TCC and RCC is prevented from erroneously receiving the state code TCC or RCC as the speed code TSC.

The state code TCC will now be described.

As one example, a five-bit state code TCC will be described. The state code TCC includes five bits B1 to B5.

The first bit B1 is node information. The node information indicates a target node of the state code TCC. The node information having value "1" indicates that the state code TCC is information of the transmission-side node. The node information having value "0" indicates that the state code TCC is information of the reception-side node.

For example, when the first node 10 is the transmission-side node and the second node 20 is the reception-side node, the first node 10 transmits the state code TCC that corresponds to the state of the transmission-side node, that is, its transmission circuit 15. Further, the first node 10 transmits the state code TCC for the reception-side node, that is, the reception circuit 23 of the second node 20.

The second bit B2 is maximum operation information. The maximum operation information indicates whether the transmission circuit is operating in a maximum operation state. The maximum operation information having value "1" indicates operation in a maximum state, and the maximum operation information having value "0" indicates operation that is not in the maximum state. In the maximum operation state, the transmission amplitude is maximized and the de-emphasis circuit 15a is activated. In a non-maximum operation state, the transmission amplitude is not maximized or the de-emphasis circuit 15a is inactivated.

A device coupled to an IEEE1394.b standard network is operable at any one of a plurality of different transfer rates. For example, the device operates in any one of the modes S400, S800, S1600, and S3200. In these modes, the maximum amplitude (output amplitude) of the output signal of the device is 800 mV and the same. However, the maximum transfer rate and the tolerable minimum value of the output amplitude differ between modes. For example, in S400, the maximum transfer rate is 500 Mbps and the output amplitude minimum value is 300 mV. In S800, the maximum transfer rate is 1 Gbps and the output amplitude minimum value is 350 mV. In S1600, the maximum transfer rate is 2 Gbps and the output amplitude minimum value is 475 mV.

The third bit B3 and the fourth bit B4 are transmission amplitude value information. The transmission amplitude value information indicates an amplitude value (transmission amplitude value) of the transmission signal output from the transmission circuit. For example, the transmission amplitude value information having value "11" corresponds to the maximum amplitude value (800 mV). In the same manner, value "10" corresponds to 700 mV, value "01" corresponds to 600 mV, and value "00" corresponds to 500 mV.

The fifth bit B5 is de-emphasis operation information. The de-emphasis operation information indicates the state of the de-emphasis circuit 15a. The de-emphasis operation information having value "1" indicates that the de-emphasis circuit 15a is activated, and the de-emphasis operation information having value "0" indicates that the de-emphasis circuit 15a is inactivated.

The state code TCC is transmitted from the transmission-side node to the reception-side node. Accordingly, information of the reception circuit transmitted from the transmission-side node sets the reception circuit in the reception-side node. That is, the state code TCC in which the first bit B1 is "0" is information set to the reception circuit in the reception-side node. For example, the reception circuit includes the equalizer. Thus, the adjustment circuit of the reception-side node, for example, the adjustment circuit 24a illustrated in FIG. 2 generates the equalizer control signal CE1 corresponding to the fifth bit B5 in the received state code TCC. The equalizer 23a illustrated in FIG. 2 is activated and inactivated in response to the control signal CE2.

The state code RCC will now be described.

As one example, a five-bit state code RCC will be described. The state code RCC transmitted by the reception-side node includes five bits B1 to B5.

The first bit B1 is node information. The node information indicates a target node of the state code RCC in the same manner as the node information in the state code TCC. The node information having value "1" indicates that the state code RCC is the information of the transmission-side node, and the node information having value "0" indicates that the state code RCC is the information of the reception-side node. For example, when the first node 10 is the transmission-side node and the second node 20 is the reception-side node, the second node 20 transmits the state code RCC that indicates the state of the reception-side node, that is, its reception circuit 23. Further, the second node 20 transmits the state code RCC for the transmission-side node, that is, the transmission circuit 15 of the first node 10.

The second to fourth bits B2 to B4 are reception amplitude value information. The reception amplitude value information indicates the amplitude value of a received signal detected by the amplitude detector 23b in the second node 20. The physical logic unit 24 generates the reception amplitude value information that corresponds to the detection of the amplitude detector 23b. For example, the physical logic unit 24 generates reception amplitude value information of "111" when the amplitude value is 400 mV or greater. In the same manner, the physical logic unit 24 generates the reception amplitude value information of "110" when the amplitude value is 350 mV or greater and less than 400 mV, "101" when the amplitude value is 300 mV or greater and less than 350 my, "100" when the amplitude value is 250 mV or greater and less than 300 mV, and "011" when the amplitude value is 200 mV or greater and less than 250 mV. Further, the physical logic unit 24 generates the reception amplitude value information of "010" when the amplitude value is 150 mV or greater and less than 200 mV, "001" when the amplitude value is 100 mV or greater and less than 150 mV, and "000" when the amplitude value is less than 100 mV. The reception amplitude value information generated in such a manner is included in the state code RCC transmitted from the reception-side node.

The fifth bit B5 is equalizer operation information. The equalizer operation information indicates the state of the equalizer 23a. The equalizer operation information having value "1" indicates that the equalizer 23a is activated, and the equalizer operation information having value "0" indicates that the equalizer 23a is inactivated.

The transmission-side node and the reception-side node are determined at a timing when the state code is transmitted in the third state ST3. In the third state ST3, the two nodes coupled through a transmission path each operate as a transmission-side node to transmit the state code TCC to the other node. Then, the one of the nodes that transmits the state code at an earlier timing than the other node operates as the transmission-side node. Then, when adjustment of the transmission circuit and the reception circuit in a single path ends, the transmission-side node and the reception-side node are exchanged, and the transmission circuit and the reception circuit in the path are adjusted.

For example, when the timing at which the first node 10 transmits the state code is earlier than the timing at which the second node 20 transmits the state code, the first node 10 operates as the transmission-side node and the second node 20 operates as the reception-side node. Thus, the first node 10 adjusts the transmission circuit 15, while the second node 20 adjusts the reception circuit 23. Next, the second node 20 operates as the transmission-side node and adjusts the transmission circuit 25. In this situation, the first node 10 operates as the reception-side node and adjusts the reception circuit 13.

The configuration of the adjustment circuit 14a in the first node 10 will now be described with reference to FIG. 3. The configuration of the adjustment circuit 24a in the second node 20 illustrated in FIG. 2 is the same as that of the adjustment circuit 14a. Thus, the adjustment circuit 24a will not be described or illustrated in detail like the adjustment circuit 14a.

Figure 3:
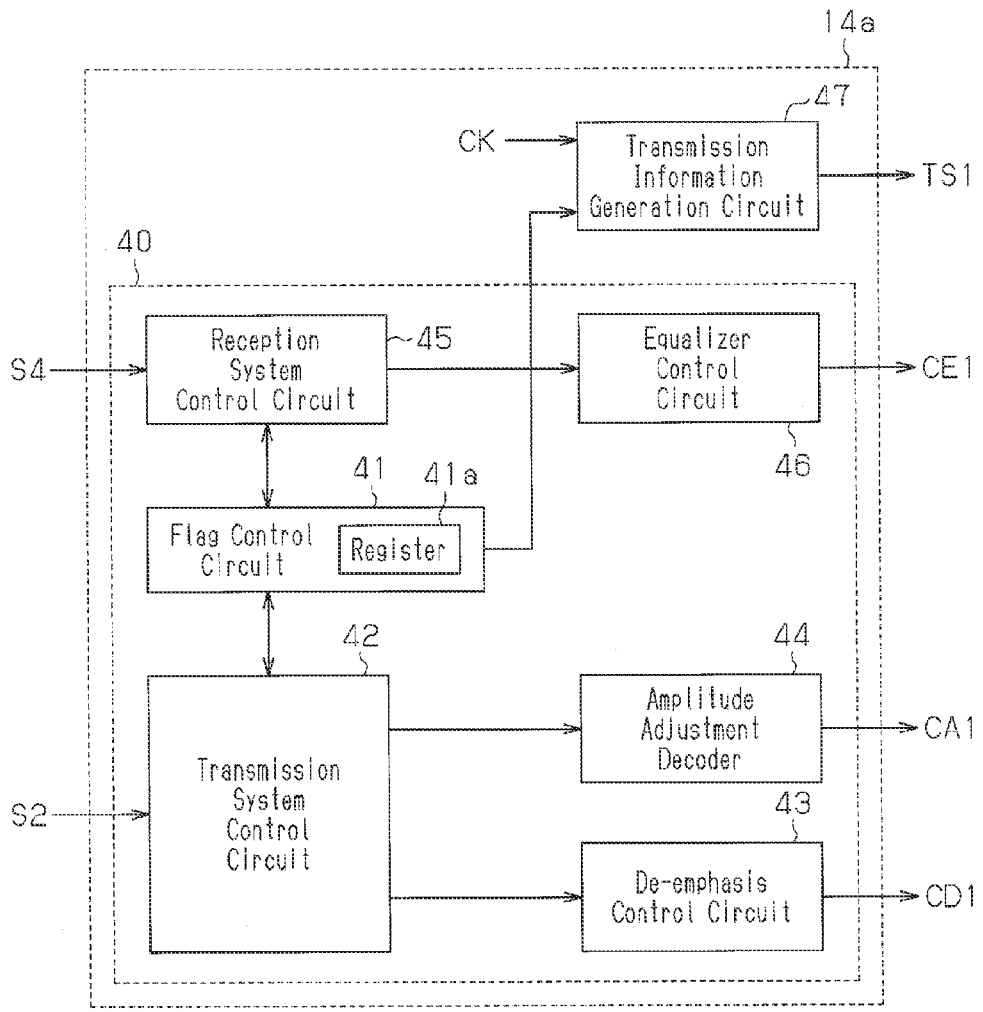
FIG. 3 is a block diagram of an adjustment circuit.

As illustrated in FIG. 3, the adjustment circuit 14a includes an optimization circuit 40, which optimizes the reception circuit 13 and the transmission circuit 15 shown in FIG. 2. The optimization circuit 40 includes a flag control circuit 41, a transmission system control circuit 42, a de-emphasis control circuit 43, an amplitude adjustment decoder 44, a reception system control circuit 45, and an equalizer control circuit 46.

The flag control circuit 41 is provided with an initial value of the physical logic unit 14 and stores a flag in a register 41a in accordance with the setting of the initial value. The flag stored in the register 41a indicates the operation conditions for the reception circuit 13 and the transmission circuit 15. That is, the flag includes a value that indicates the operation state of the equalizer 13a in the reception circuit 13, a value that indicates the operation state of the de-emphasis circuit 15a in the transmission circuit 15, and a transmission amplitude value of the transmission signal Tx output from the transmission circuit 15. The operation state of the equalizer 13a is indicated by, for example, a one-bit flag. The operation state of the de-emphasis circuit 15a is indicated by, for example, one-bit flag. Further, the amplitude value of the transmission circuit 15 is indicated by, for example, a four-bit flag.

The flag control circuit 41 outputs transmission control information to the transmission system control circuit 42 based on the flag stored in the register 41a. The transmission control information includes a value that indicates the operation state of the de-emphasis circuit 15a and the transmission amplitude value of the transmission circuit 15. Further, the flag control circuit 41 stores the transmission control information (i.e., the value that indicates the operation state of the de-emphasis circuit 15a and the transmission amplitude value of the transmission circuit 15) from the transmission system control circuit 42 in the register 41a as a flag.

The flag control circuit 41 outputs reception control information to the reception system control circuit 45 based on the flag stored in the register 41a. The reception control information includes a value that indicates the operation state of the equalizer 13a. Further, the flag control circuit 41 stores the reception control information (i.e., the value that indicates the operation state of the equalizer 13a) from the reception system control circuit 45 in the register 41a as a flag.

The transmission system control circuit 42 is provided with reception information S2 based on a signal transmitted from the second node 20. The reception information S2 includes the receipt notification signal ACK and reception information of the reception circuit 23 in the second node 20. The reception information includes the amplitude value of the received signal RS2 detected by the amplitude detector 23b in the reception circuit 23 and ON/OFF information of the equalizer 23a. The reception information is transmitted from the second node 20 using the state code RCC illustrated in FIG. 5C.

The transmission system control circuit 42 first controls the transmitting circuit, that is, the transmission circuit 15 based on the transmission control information. For example, the transmission system control circuit 42 provides the de-emphasis control circuit 43 with a signal that controls the de-emphasis circuit 15a in the transmission circuit 15. Further, the transmission system control circuit 42 supplies the amplitude adjustment decoder 44 with a signal that adjusts the amplitude of the transmission signal Tx output by the transmission circuit 15. When receiving reception information S2, the transmission system control circuit 42 sets a transmission amplitude value of the transmission circuit 15 and an operation state of the de-emphasis circuit 15a based on the reception information S2. Further, the transmission system control circuit 42 generates information that controls the equalizer 23a of the reception circuit 23 in the communication peer node, that is, the second node 20.

The de-emphasis control circuit 43 generates the de-emphasis control signal CD1 for the de-emphasis circuit 15a of the transmission circuit 15 based on the signal from the transmission system control circuit 42. The amplitude adjustment decoder 44 decodes the signal from the transmission system control circuit 42 to generate the amplitude control signal CA1, which is supplied to the transmission circuit 15.

The reception system control circuit 45 receives transmission information S4, which is based on the signal transmitted from the second node 20. The transmission information S4 includes control information for the equalizer 13a of the reception circuit 13. The reception system control circuit 45 provides the equalizer control circuit 46 with a signal that controls the equalizer 13a, based on the transmission information S4. The equalizer control circuit 46 generates the equalizer control signal CE1 on the equalizer 13a based on the signal received from the reception system control circuit 45.

The flag control circuit 41 provides a transmission information generation circuit 47 with the flag stored in the register 41a. The transmission information generation circuit 47 is provided with a clock signal CK and the value corresponding to the operation mode from the physical logic unit 14 illustrated in FIG. 2. The transmission information generation circuit 47 generates the tone signal TN based on the clock signal CK. Further, the transmission information generation circuit 47 generates the speed code TSC based on the value that corresponds to the operation mode.

Further, the transmission information generation circuit 47 is provided with a reception amplitude value from the amplitude detector 13b illustrated in FIG. 2. The transmission information generation circuit 47 generates the state code TCC based on the value from the flag control circuit 41 (transmission control information). Further, the transmission information generation circuit 47 generates the state code RCC based on a reception amplitude value.

The detection of coupling between the nodes 10 and 20 and environment setting, that is, the processes performed in state ST2 for tone transmission state ST3 for communication environment setting shown in FIG. 4 will now be described.

Figure 7:
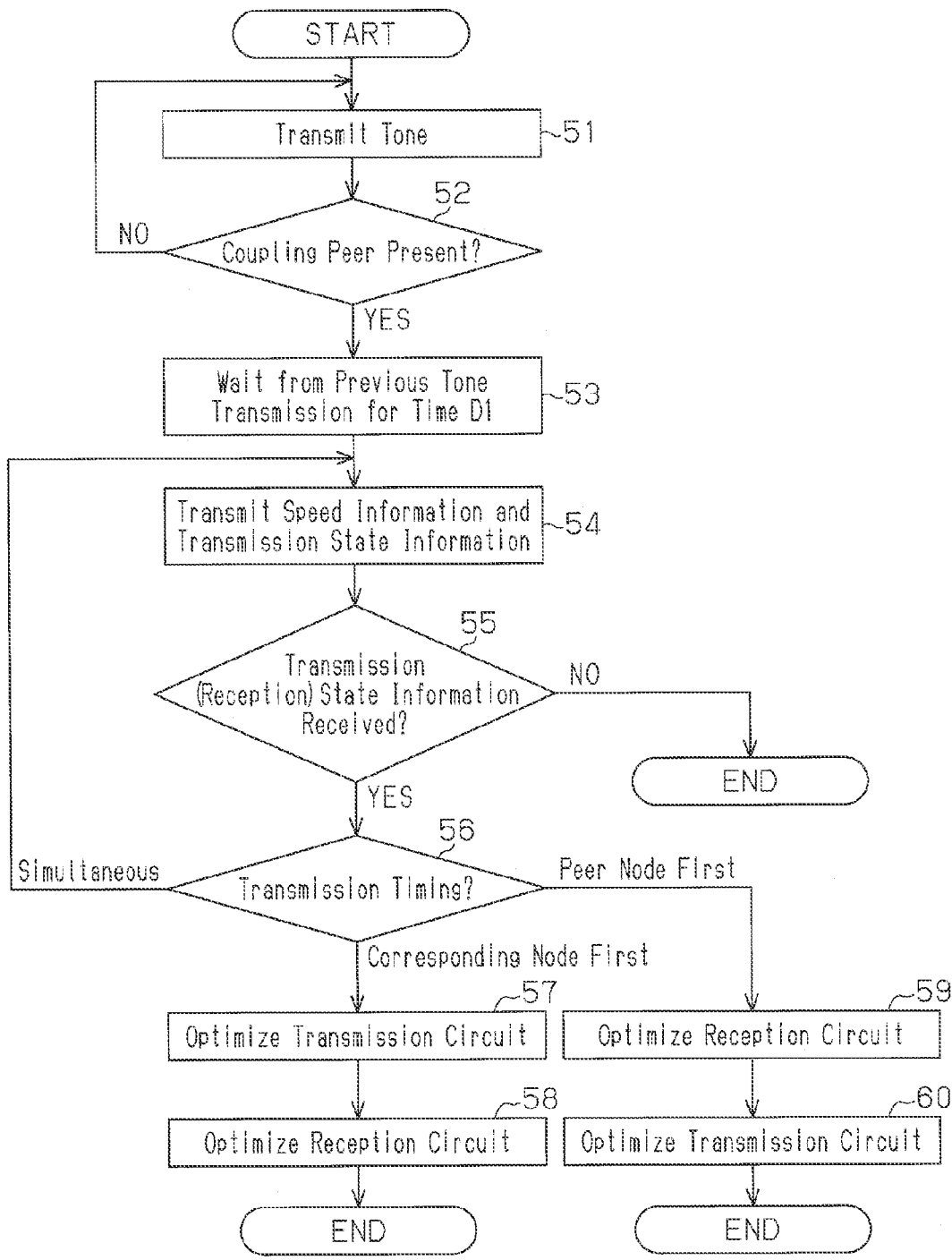
FIG. 7 is a flowchart of an adjustment process in a first embodiment.

As illustrated in FIG. 7, in step 51, the transmission system control circuit 42 in the first node 10 transmits the tone signal TN from the transmission circuit 15 whenever period D1 elapses as illustrated in FIG. 5A. In the same manner, the transmission system control circuit 42 in the second node 20 transmits the tone signal TN from the transmission circuit 25 whenever time D1 elapses.

Next, in step S52, the nodes 10 and 20 each determine whether or not a communication peer is coupled thereto. The determination as to whether a communication peer is coupled is performed by determining whether the physical logic units 14 and 24 have each received the tone signal TN and the acknowledgement signal ACK as described above. If the tone signal and the acknowledgement signal ACK have not yet been received, the nodes 10 and 20 each determine that there is no coupled communication peer (NO) and proceeds to step S51. When the tone signal TN and the acknowledgement signal ACK are received, the nodes 10 and 20 each determine that a communication peer has been coupled (YES) and proceeds to step S53. That is, the nodes 10 and 20 repeat the processing of steps 51 and 52 until the tone signal TN and the acknowledgement signal ACK are received. The nodes 10 and 20 may perform the processing of steps 51 and 52 intermittently. Further, the nodes 10 and 20 may stop this operation after having continued the processing of steps 51 and 52 for a certain period.

Next, in step 53, the nodes 10 and 20 wait until a certain time (for example, a time equivalent to the interval of time D1) elapses from the previous transmission of the tone signal TN. The waiting ensures that the communication peer detects the next transmission of the tone signal TN. As described above, the speed codes TSC and RSC and the state codes TCC and RCC are each a pulse signal similar to the tone signal TN. Accordingly, the waiting is performed to prevent the nodes 10 and 20 from erroneously detecting the speed code TSC and the like as the tone signal TN.

Next, in step 54, after transmitting the tone signal TN, the nodes 10 and 20 each transmit the speed information (speed code TSC) and the state information (state code TCC).

In step 55, the nodes 10 and 20 each determine whether the state information has been received. If the state information has not yet been received (NO), the nodes 10 and 20 each end the processing illustrated in FIG. 7. In this case, the nodes 10 and 20 perform speed negotiation. That is, the nodes set an operation mode (communication speed) in which the nodes are able to communicate with each other based on the speed information (speed code TSC) they transmit to each other.

In step 55, if the state information is received (YES), the nodes 10 and 20 proceed to step 56. In step 56, the nodes 10 and 20 each determine the timing at which the state information was transmitted in step 54. Then, based on the determination of the transmission timing, the nodes 10 and 20 each perform the processing of steps 57 and 58 or the processing of steps 59 and 60.

Figure 8:
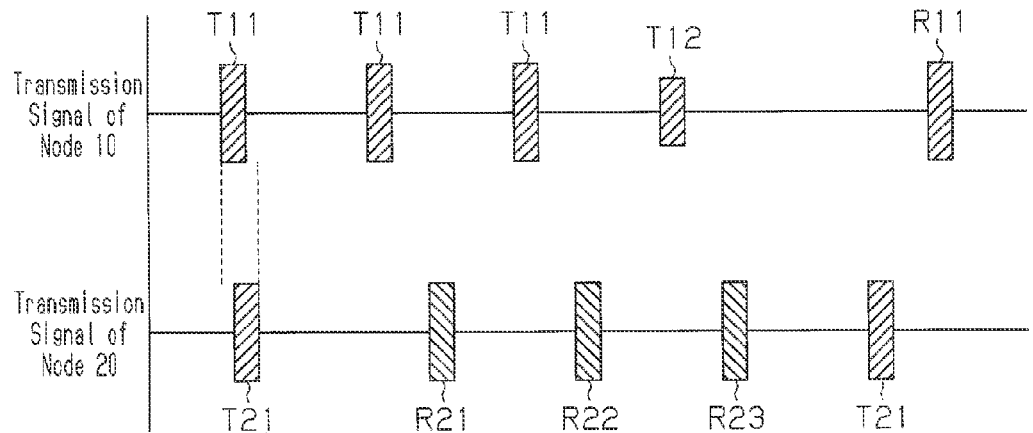
FIG. 8 is a time chart illustrating communication timings of nodes.

For example, as illustrated in FIG. 8, the first node 10 transmits transmission state information T11 and the second node 20 transmits transmission state information T21. In this case, when the transmission of the transmission state information T11 is completed, the first node 10 is receiving the transmission state information T21 from the second node 20. In contrast, when the transmission of the transmission state information T21 is completed, the second node 20 has already completed the reception of the transmission state information T11 from the first node 10.

Accordingly, the first node 10 determines that its transmission timing is earlier than that of the peer node (it is first). In this state, the second node 20 determines that its transmission timing is later than the peer node's transmission timing (the peer node is first). Accordingly, the first node 10 optimizes the transmission circuit in step 57 and then optimizes the reception circuit in step 58. The second node 20 optimizes the reception circuit in step 59 and then optimizes the transmission circuit in step 60.

More specifically, when the first node 10 optimizes the transmission circuit in step 57, the second node 20 optimizes the reception circuit in step 59. Subsequently, when the first node 10 optimizes the reception circuit in step 58, the second node 20 optimizes the transmission circuit in step 60.

For example, as illustrated in FIG. 8, the first node 10 transmits the transmission state information T11. The transmission state information T11 includes the state code TCC illustrated in FIG. 9A. The amplitude value of the state code TCC is, for example, an initially set value (maximum amplitude value, 800 mV in the example described above).

Figure 10A:
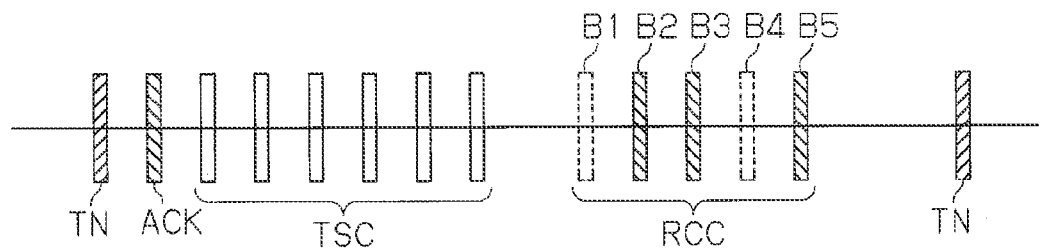
FIGS. 10A to 10C are diagrams illustrating reception state information.

The second node 20 receives the transmission state information T11 and transmits reception state information R21. The reception state information R21 includes a state code RCC of "01101" for bits B1 to B5 as illustrated in FIG. 10A. A bit string of "110" for the second bit B2 to the fourth bit B4 indicates that the amplitude of the received signal is in the range of "350 mV to 400 mV". Further, the fifth bit B5 is "1". This indicates that the equalizer 23a in the second node 20 is activated.

Subsequently, the first node 10 receives the reception state information R21 and transmits the transmission state information T11.

Figure 10B:
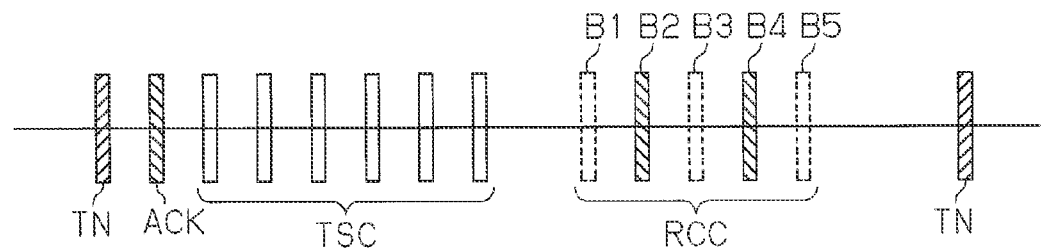

The second node 20 inactivates the equalizer 23a, receives the transmission state information T11, and transmits the reception state information R22. The reception state information R22 includes a state code RCC of, for example, "01010" for bits B1 to B5 as illustrated in FIG. 10B. A bit string of "101" for the second bit B2 to the fourth bit B4 indicates that the amplitude of the received signal is in the range of "300 mV to 350 mV". Further, the fifth bit B5 is "0". This indicates that the equalizer 23a in the second node 20 is inactivated.

Figure 9A:
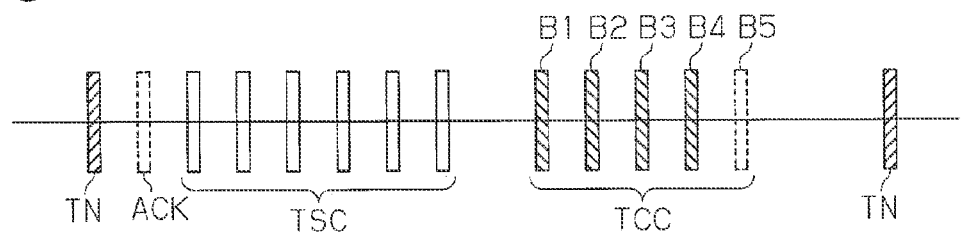
FIGS. 9A and 9B are diagrams illustrating transmission state information.
Figure 9B:
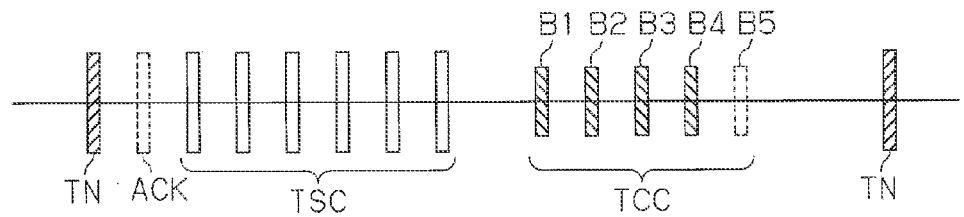

Subsequently, the first node 10 receives the reception state information R22 and sets the amplitude of a transmission signal based on the reception state information R22 (the state code RCC illustrated in FIG. 10B). Then, as illustrated in FIG. 8, the first node 10 transmits the transmission state information T12 having the set amplitude value. The amplitude of the transmission state information T12 has the value set based on the state code RCC. The transmission state information T12 includes the state code TCC having a smaller amplitude than the tone signal TN or the speed code TSC as illustrated in FIG. 9B. The amplitude of the state code TCC is, for example, "550 mV".

Figure 10C:
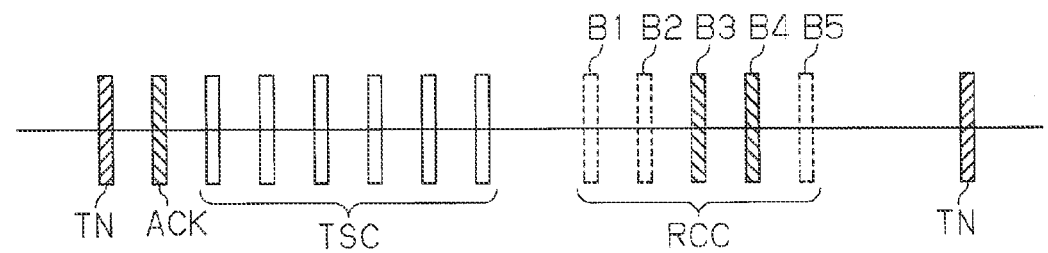

The second node 20 receives the transmission state information T12 and transmits the reception state information R23. The reception state information R23 includes a state code RCC of, for example. "00110" for bits B1 to B5 as illustrated in FIG. 10C. A bit string of "011" for the second bit B2 to the fourth bit B4 indicates that the amplitude of the received signal is in the range of "200 mV to 250 mV". Further, the fifth bit B5 is "0". This indicates that the equalizer 23a in the second node 20 is inactivated.

Subsequently, the first node 10 receives the reception state information R23. Then, based on the reception state information R23, the first node 10 determines that the equalizer 23a of the reception circuit 23 in the reception-side node, that is, the second node 20 is inactivated and the amplitude of the signal at the reception terminal is in a specified range (e.g., satisfies the minimum amplitude value of 200 mV set by the standard). Then, the first node 10 determines that the transmission circuit 15 and the reception circuit 23 in the second node 20 are optimized.

When adjustment ends in one path through such transmission and reception of signals, the adjustment of the next path is started. That is, the second node 20 transmits the transmission state information T21. When receiving the transmission state information T21, the first node 10 transmits the reception state information R11. Although not described and illustrated, in the same manner as the processing in the first path, the first node 10 adjusts the reception circuit 13 and the second node 20 adjusts the transmission circuit 25. Then, the adjustment processing ends.

In step 56 illustrated in FIG. 7, when the first node 10 determines that the peer node is first, the second node 20 determines that it is first. Then, the first node 10 optimizes the reception circuit in step 59 and then optimizes the transmission circuit in step 60. The second node 20 optimizes the transmission circuit in step 57 and then optimizes the reception circuit in step 58.

The nodes 10 and 20 proceed to step 54 when determining in step 56 that the transmission timing is the same in nodes 10 and 20. This is to determine which one of the two paths be optimized first.

The optimization process will now be described in detail.

In the description hereafter, the optimization process is performed on the transmission circuit in the first node and the reception circuit 23 in the second node 20, which are included in the same path. The optimization process performed on the transmission circuit 25 in the second node and the reception circuit 13 in the first node 10 will be easily understood through this description.

Figure 11:
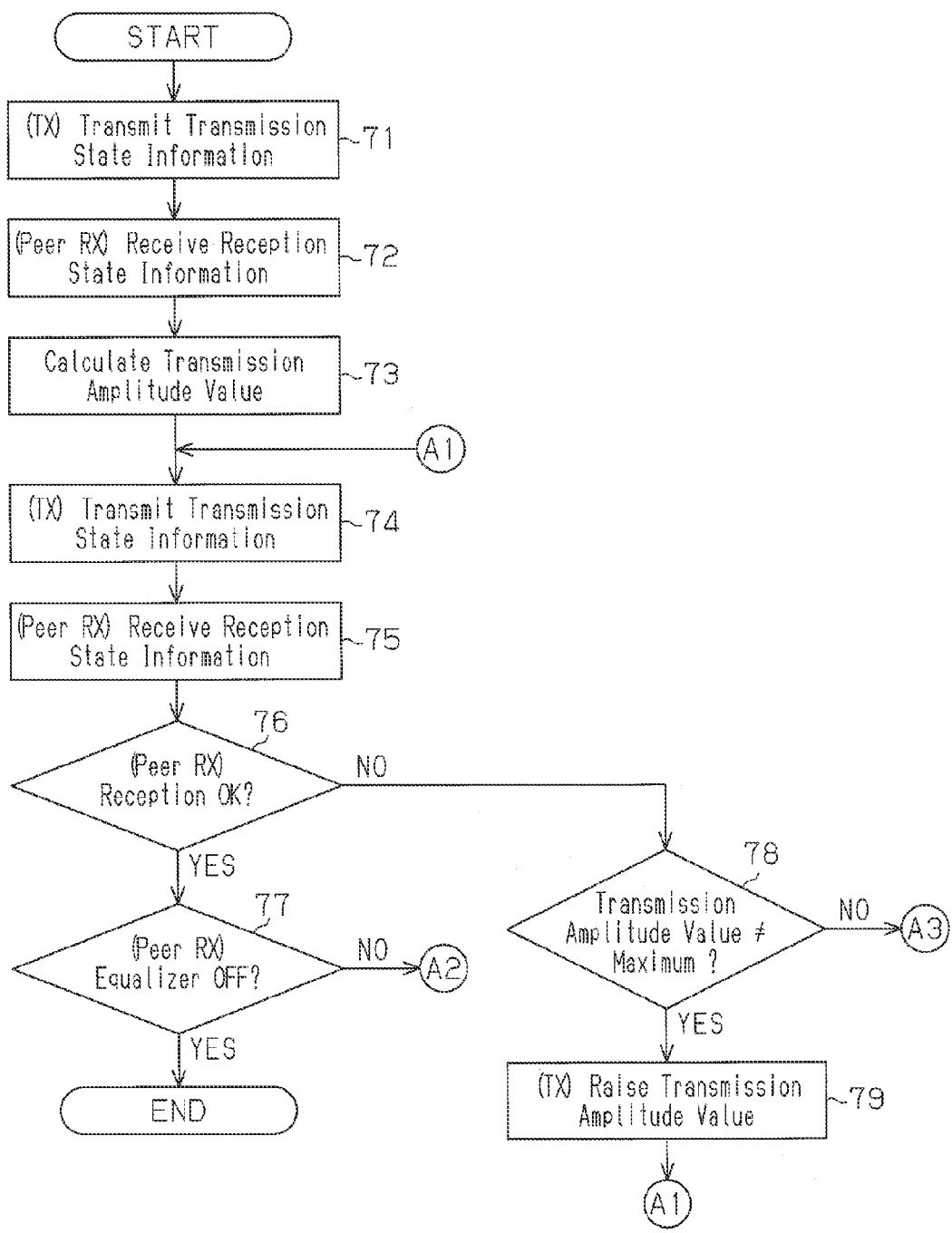
FIG. 11 is a flowchart illustrating an adjustment process in the first embodiment.

As illustrated in FIG. 11, in step 71, the transmission system control circuit 42 of the first node 10 shown in FIG. 2 transmits the transmission state information (state code TCC) that corresponds to the transmission circuit 15 (indicated as (TX) in the drawing) via the transmission circuit 15. In this case, the transmission circuit 15 transmits the amplitude control signal CA1 provided from the adjustment circuit 14a, that is, the transmission state information related to the amplitude that corresponds to a transmission amplitude value.

The second node 20 illustrated in FIG. 2 receives the signal transmitted from the transmission circuit 15 of the first node 10 with the reception circuit 23. The amplitude detector 23b in the reception circuit 23 detects the amplitude value of the received signal at the reception terminal and outputs the detected amplitude value SS2 (reception amplitude value). The adjustment circuit 24a in the second node 20 transmits the reception amplitude value and the reception state information (state code RCC) including the operation state of the equalizer 23a from the transmission circuit 25. Here, the transmission circuit 25 transmits a transmission signal under a certain operation condition (for example, the transmission amplitude value is maximum). In the same manner, the second node 20 transmits the reception state information in response to the received signal through the processing described below.

Next, in step 72, the transmission system control circuit 42 in the first node 10 receives via the reception circuit 13 the reception state information (state code RCC) that corresponds to a reception state of the reception circuit 23 (indicated as (peer RX) in the drawing) in the second node 20. The reception state information includes the reception amplitude value detected by the amplitude detector 23b in the second node 20 and the state of the reception circuit 23 (state of the equalizer 23a) and is transmitted from the transmission circuit 25 in the second node 20. The signal amplitude value detected by the amplitude detector 23b corresponds to the amplitude value of the signal (transmission state information) transmitted from the transmission circuit 15 in step 71.

Next, the transmission system control circuit 42 calculates a transmission amplitude value for the transmission circuit 15 based on the transmission state information (transmission amplitude value of the transmission circuit 15) and the reception amplitude value in the reception state information.

When the transmission amplitude value set for the transmission circuit 15 is represented by TA1, the reference value is represented by Rrf (for example, the minimum amplitude value at the reception terminal specified by the standard), and the reception-terminal amplitude value is represented by RA1, the transmission system control circuit 42 calculates a transmission amplitude value TA2 set for the transmission circuit 15 using the following equation 1, which is shown below.

$$TA2 = TA1 \times (Rrf \div RA1) \tag{1}$$

The transmission system control circuit 42 calculates the transmission amplitude value so that the ratio between the present transmission amplitude value and the calculated transmission amplitude value is equal to the ratio between the reception amplitude value and the reference value (TA1: TA2=RA1:Rrf).

The amplitude of the transmission signal output from the transmission circuit 15 illustrated in FIG. 2 is adjusted in a stepped manner by the amplitude control signal CA1 from the amplitude adjustment decoder 44 illustrated in FIG. 3. The transmission system control circuit 42 selects a minimum amplitude value that is not less than the amplitude value TA2 for the calculated amplitude value TA2. For example, the range of the adjusted transmission amplitude value is 200 mV to 800 mV, and the adjustment step is 50 mV. Then, assuming that the amplitude value TA1 is 800 mV, the reception-terminal amplitude value RA1 is 300 my, and the reference value Rrf is 200 mV (minimum amplitude value at the reception terminal specified by the standard), the amplitude value TA2 is approximately 533 mV (=(800×(200÷300))). Accordingly, the transmission system control circuit 42 selects 550 mV as the minimum value that is not less than the amplitude value TA2. Then, the transmission system control circuit 42 outputs a transmission signal having the calculated transmission amplitude value (=550 mV) to the amplitude adjustment decoder 44 illustrated in FIG. 3 so that the signal is output by the transmission circuit 15. The amplitude adjustment decoder 44 outputs the amplitude control signal CA1 to the transmission circuit 15 based on the signal output from the transmission system control circuit 42. That is, the transmission system control circuit 42 sets the calculated transmission amplitude value to the transmission circuit 15.

The signal output from the transmission system control circuit 42 to the amplitude adjustment decoder 44 is a code of a plurality of (for example, four) bits corresponding to the calculated transmission amplitude value. The code takes a value of "1111" to "0011" in correspondence with the amplitude adjustment range, where value "1111" corresponds to the maximum amplitude value (800 mV) that may be output by the transmission circuit 15. In this manner, the code corresponds to the transmission amplitude value information.

As described above, the reception amplitude value in the reception state information RCC is a code that corresponds to the detected amplitude value and indicates a value in a certain range. For example, a three-bit code of "100" indicates that the reception amplitude value is in a rage of "250 mV to 300 mV". In other words, the amplitude detector 23b of the reception circuit 23 outputs the three-bit code of "100" for an amplitude value in the range of "250 mV to 300 mV". Thus, the transmission system control circuit 42 calculates the transmission amplitude value TA2 using the minimum value in the range corresponding to the code. This processing adopts a stepped value that is not less than the calculation result as the set transmission amplitude value. However, a stepped value close to the calculation result may be adopted.

The transmission system control circuit 42 may calculate the transmission amplitude value TA2 by directly using the code in the reception state information. For example, when the maximum value of the transmission amplitude value that may be set is "1111", the reference value Rrf is "0011", and the reception amplitude value RA1 is "0101", the above calculation results in "1001". The transmission system control circuit 42 sets the calculation result (transmission amplitude value) to the transmission circuit 15 via the amplitude adjustment decoder 44 illustrated in FIG. 3.

A four-bit code corresponding to the calculated transmission amplitude value (550 mV) is "1010" (binary code). The transmission system control circuit 42 outputs the code to the amplitude adjustment decoder 44. The amplitude adjustment decoder 44 decodes the code from the transmission system control circuit 42 to generate the amplitude control signal CA1 and outputs the amplitude control signal CA1 to the transmission circuit 15. As a result, a transmission signal having the calculated transmission amplitude value is transmitted from the transmission circuit 15. Further, the transmission system control circuit 42 changes the transmission amplitude value to change the amplitude of the signal transmitted from the transmission circuit 15.

However, when the signal having the minimum transmission amplitude value transmitted from the transmission circuit 15 is received by the reception circuit 23, the transmission system control circuit 42 does not change the transmission amplitude value. Further, when the signal having the maximum transmission amplitude value transmitted from the transmission circuit 15 is received by the reception circuit 23, the transmission system control circuit 42 does not change the transmission amplitude value.

Next, in step 74, the transmission system control circuit 42 transmits a signal having the transmission amplitude (=550 mV) set in the transmission state information from the transmission circuit 15. The amplitude in this transmission state information corresponds to the transmission amplitude value. Next, in step 75, the reception circuit 13 receives the reception state information that indicates a reception state in the reception circuit 23 in the second node 20. The reception state information includes a reception amplitude value detected when the transmission state information transmitted from the transmission circuit 15 is received in step 74.

Next, in step 76, the transmission system control circuit 42 determines whether or not the reception circuit 23 is capable of receiving the signal having the transmission amplitude value set to the transmission circuit 15 based on the reception state information.

When determined that the signal is receivable (YES), the transmission system control circuit 42 proceeds to step 77.

In step 77, the transmission system control circuit 42 determines whether the equalizer 23a of the reception circuit 23 in the second node 20 is inactivated based on the reception state information. That is, the transmission system control circuit 42 determines whether the reception performance of the reception circuit 23 is decreasable. If the equalizer 23a is inactivated (YES), the reception performance is not further decreasable. Thus, the transmission system control circuit 42 ends the optimization process.

In step 76, when determining that the signal is not receivable (NO), the transmission system control circuit 42 proceeds to step 78. In step 78, the transmission system control circuit 42 determines whether or not the transmission amplitude value of the transmission circuit 15 is unequal to the maximum value. If the transmission amplitude value of the transmission circuit 15 is unequal to the maximum value (YES), the transmission system control circuit 42 proceeds to step 79. In step 79, the transmission system control circuit 42 increases the present set value of the transmission amplitude value of the transmission circuit 15 by an adjustment step. As described above, the transmission system control circuit 42 provides the amplitude adjustment decoder 44 with a four-bit code that corresponds to the transmission amplitude value so that the amplitude adjustment decoder 44 decodes the input signal to generate the amplitude control signal CA1. Thus, the adjustment step corresponds to a value that changes the LSB of the code, that is, "1". Then, the transmission system control circuit 42 adds "1" to the code output to the amplitude adjustment decoder 44 and outputs the code of the sum to the amplitude adjustment decoder 44. As a result, the transmission system control circuit 42 increases the amplitude of the transmission circuit 15. Then, the transmission system control circuit 42 proceeds to step 74.

Figure 12:
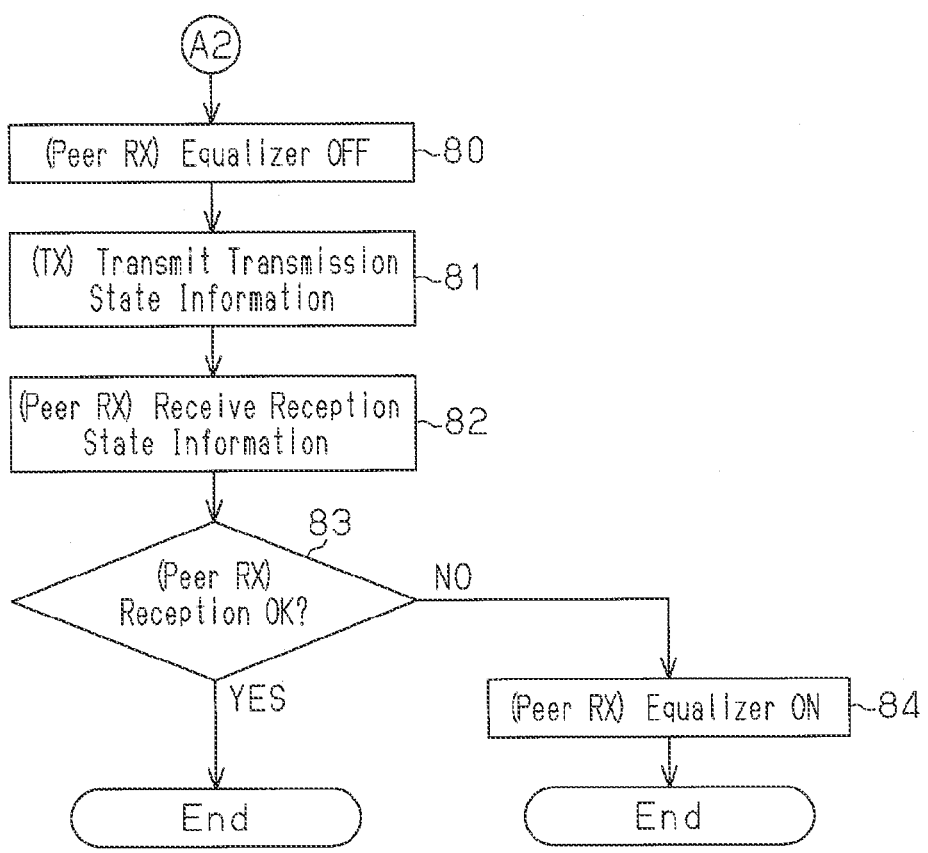
FIG. 12 is a flowchart illustrating the adjustment process in the first embodiment.

When determining in step 77 that the equalizer 23a of the reception circuit 23 in the second node 20 is not inactivated (NO), the transmission system control circuit 42 proceeds to step 80 illustrated in FIG. 12.

In step 80, the transmission system control circuit 42 controls and inactivates the equalizer 23a in the second node 20. This decreases the reception performance of the reception circuit 23 in the second node 20.

Next, in step 81, the transmission system control circuit 42 transmits the transmission state information from the transmission circuit 15. Here, the transmission circuit 15 transmits the transmission state information at the same transmission amplitude as that in step 74 illustrated in FIG. 11, that is, the transmission amplitude set in step 73 (=550 mV).

Next, in step 82, the transmission system control circuit 42 receives the reception state information (the reception amplitude value and the operation state of the equalizer 23a) that indicates the reception state of the reception circuit 23 in the second node 20 via the reception circuit 13.

Next, in step 83, the transmission system control circuit 42 determines whether or not the reception circuit 23 is capable of receiving the signal transmitted from the transmission circuit 15 based on the reception state information. In step 80, the transmission system control circuit 42 has inactivated the equalizer 23a in the reception circuit 23 of the reception-side node (second node 20). Accordingly, when determined that the reception circuit 23 is capable of receiving the signal (YES), the reception performance is not further decreasable. Thus, the transmission system control circuit 42 ends the optimization process.

When determined in step 83 that the reception circuit 23 is incapable of receiving the signal (NO), the transmission system control circuit 42 proceeds to step 84. In step 84, the transmission system control circuit 42 activates the equalizer 23a in the second node 20. That is, the transmission system control circuit 42 returns the reception circuit 23 in the second node 20 to the state of step 77 illustrated in FIG. 11 in which the signal transmitted from the transmission circuit 15 is received. Then, the transmission system control circuit 42 ends the optimization process.

Figure 13:
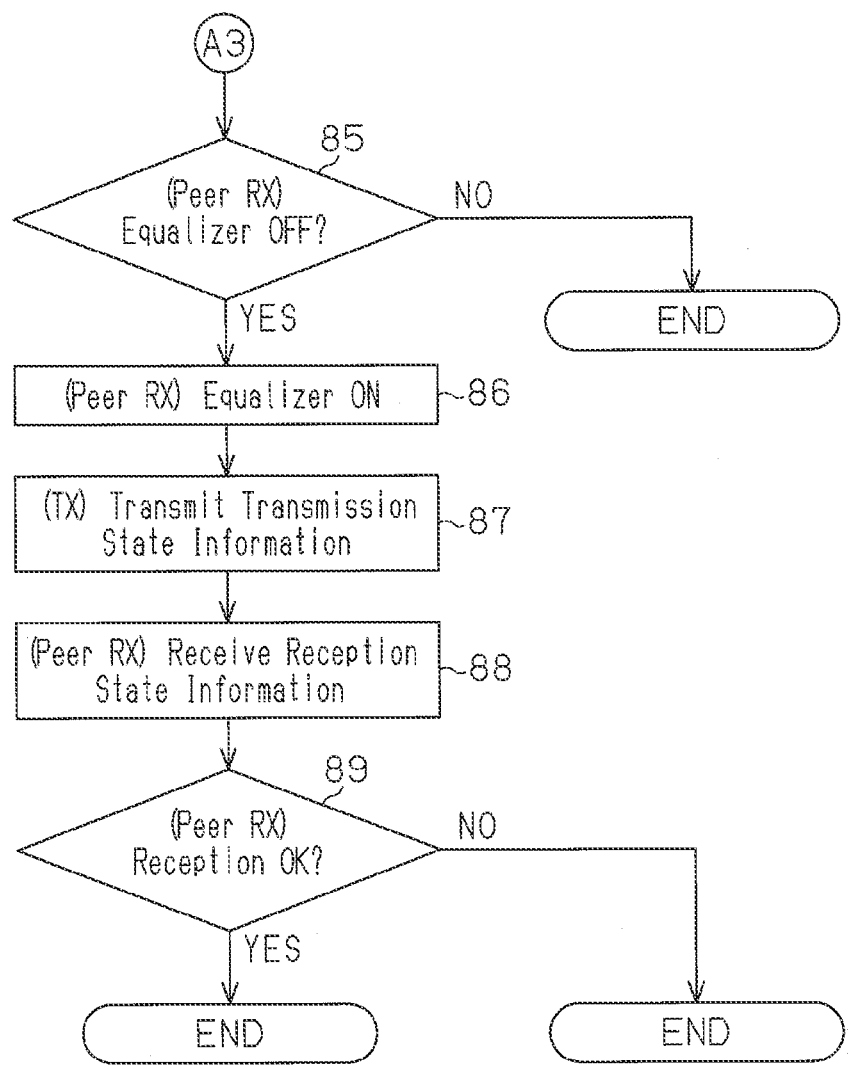
FIG. 13 is a flowchart illustrating the adjustment process in the first embodiment.

When the transmission amplitude value of the transmission circuit 15 is maximum in step 78 illustrated in FIG. 11 (NO), the transmission system control circuit 42 proceeds to step 85 illustrated in FIG. 13.

In step 85, the transmission system control circuit 42 determines whether the equalizer 23a in the second node 20 is inactivated. If the equalizer 23a is activated (NO), the transmission system control circuit 42 determines that coupling is not performable because the reception performance is not increasable. Thus, the transmission system control circuit 42 stops communication.

When the equalizer 23a is inactivated in step 85 (YES), the transmission system control circuit 42 proceeds to step 86.

In step 86, the transmission system control circuit 42 activated the equalizer 23a in the second node 20. That is, the transmission system control circuit 42 improves the reception performance of the reception circuit 23. Next, in step 87, the transmission system control circuit 42 transmits, from the transmission circuit 15, the transmission state information at the same amplitude as that in step 74 illustrated in FIG. 11, that is, the transmission amplitude set in step 73 (=550 mV) in the same manner as the process of step 81 illustrated in FIG. 12. Next, in step 88, the transmission system control circuit 42 receives via the reception circuit 13 the reception state information (the reception amplitude value and the operation state of the equalizer 23a) that indicates the reception state in the reception circuit 23 in the second node 20.

Next, in step 89, the transmission system control circuit 42 determines whether the reception circuit 23 is capable of receiving the signal transmitted from the transmission circuit 15 based on the reception state information. When determining that the reception circuit 23 is capable of receiving the signal (YES), the transmission system control circuit 42 ends the optimization process. When determining that the reception circuit 23 is incapable of receiving the signal (NO), the transmission system control circuit 42 determines that coupling is not performable because the reception performance of the reception circuit 23 is not further increasable. Thus, the transmission system control circuit 42 stops communication.

The adjustment processing described above eliminates processing performed on the de-emphasis circuit 15a in the transmission circuit 15. When controlling the activation and inactivation of the de-emphasis circuit 15a, it is easily understood that the same processes may be performed as when determining the activation and inactivated of the equalizer 23a.

The first embodiment has the advantages described below.

(1) The adjustment circuit 14a (the transmission system control circuit 42) determines whether the reception circuit 23 is capable of receiving the signal transmitted from the transmission circuit 15 based on the reception state information (state code RCC) transmitted from the second node 20. Then, when the adjustment circuit 14a determines that the reception circuit 23 is capable of receiving the signal, the adjustment circuit 14a transmits the transmission state information (state code TCC) to the second node 20 to inactivate the equalizer 23a of the reception circuit 23 in the second node 20. In the same manner, the adjustment circuit 24a in the second node 20 inactivates the equalizer 13a of the reception circuit 13 in the first node 10. Accordingly, the equalizers 13a and 23a of the reception circuits 13 and 23 in the nodes 10 and 20 are inactivated. This reduces power consumption of the reception circuits 13 and 23.

(2) The adjustment circuits 14a and 24a in the nodes 10 and 20 respectively set the transmission amplitude values of the transmission circuits 15 and 25 based on the reception amplitude values received from the peer nodes. Accordingly, the power consumption of the transmission circuits 15 and 25 may be reduced. Further, the amplitude of the transmission signal may be reduced. This reduces the radiated electromagnetic waves and electromagnetic wave noise.

(3) The adjustment circuits 14a and 24a transmit from the transmission circuits 15 and 25 signals for adjusting the reception circuits 13 and 23 and the transmission circuits 15 and 25 (i.e., transmission state information and reception state information). Accordingly, there is no need to provide an additional transmission path (cable and the like) for transmitting and receiving adjustment information. Thus, a conventional cable may be used to couple the nodes 10 and 20. Since a conventional cable may be used, the number of additional circuits is small. This suppresses enlargement of the circuit scale.

(4) In the state ST3 for communication environment setting, the nodes 10 and 20 transmit the transmission signals including information related to their respective communication speeds (speed codes) so that the communication speeds become the same. Then, in state ST3, the adjustment circuits 14a and 24a set the operation conditions for the transmission circuit and the reception circuit in each of the nodes 10 and 20. Accordingly, in state ST3, speed negotiation and operation condition setting are performed. Thus, there is no need to set another state, and enlargement of the circuit scale may be suppressed.

(5) The nodes 10 and 20 transmit the speed code TSC and the state codes TCC and RCC during a single continuous period based on the cyclically transmitted tone signal TN. This prevents elongation of a time required to process the state ST3. Further, the time from when the nodes 10 and 20 are coupled to each other to when communication becomes possible is prevented from being elongated.

Second Embodiment

A second embodiment will now be described. To avoid redundancy, like or same reference numerals are given to those components that are the same as the corresponding components of the first embodiment. Such components will not be described in detail.

The second embodiment has the same network configuration and the same device configuration as the first embodiment.

In the second embodiment, before performing environment setting, the adjustment circuits 14a and 24a in the nodes 10 and 20 activate the equalizers 13a and 23a of the reception circuits 13 and 23, for example, when or before transition to the third state ST3 illustrated in FIG. 4.

Figure 14:
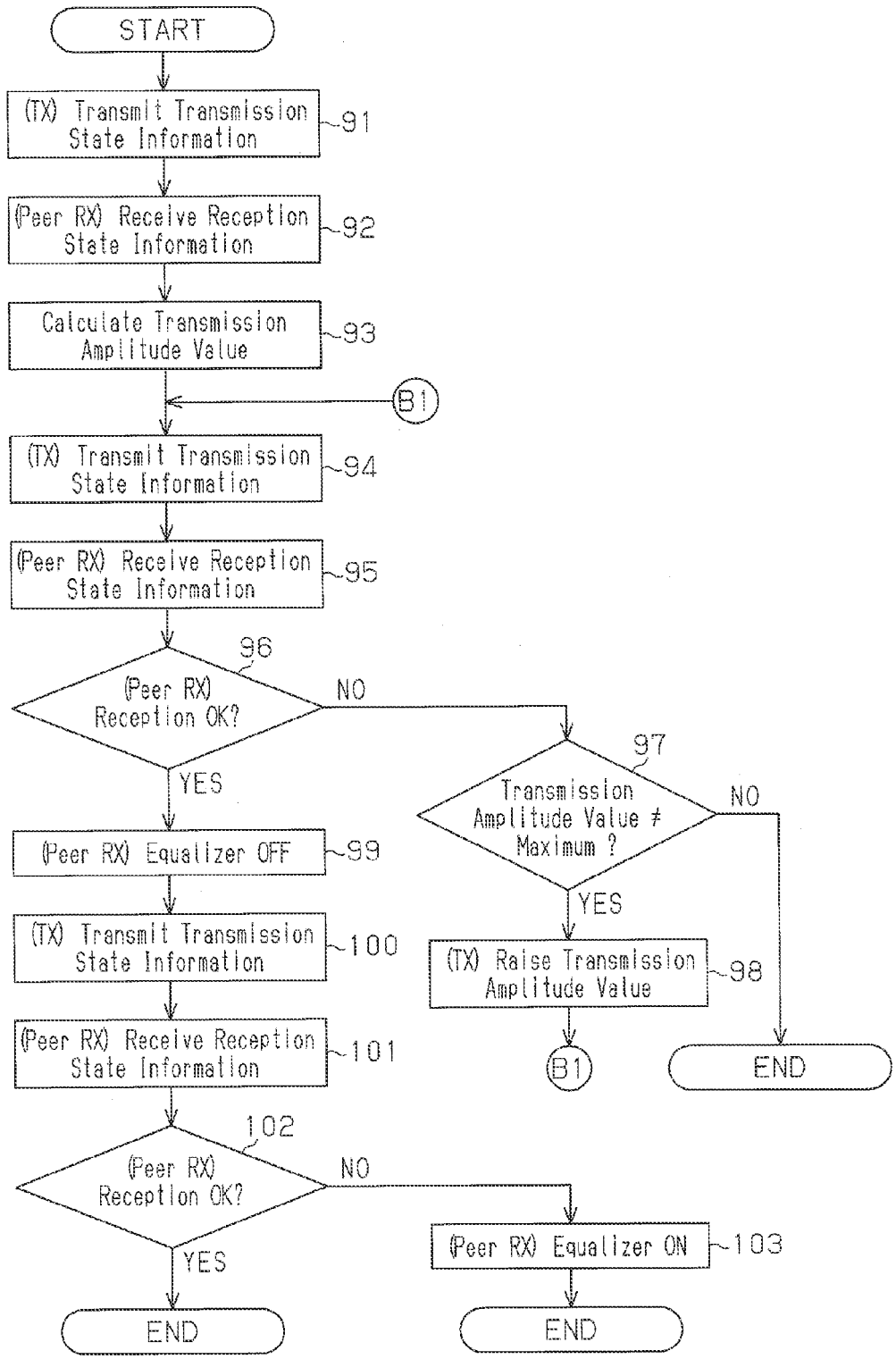
FIG. 14 is a flowchart illustrating an adjustment process in a second embodiment.

Referring to FIG. 14, in step 91, the transmission system control circuit 42 in the first node 10 illustrated in FIG. 2 transmits transmission state information (state code TCC) from a transmission circuit 15. The second node 20 receives the signal from the transmission circuit 15 of the first node 10 with the reception circuit 23 and transmits reception state information, which corresponds to the reception result of the signal, from the transmission circuit 25.

Next, in step 92, the transmission system control circuit 42 receives via the reception circuit 13 the reception state information (i.e., reception amplitude value and operation state of the equalizer 23a) that indicates the reception state in the reception circuit 23 of the second node 20.

In step 93, the transmission system control circuit 42 calculates the transmission amplitude value of the transmission circuit 15 with equation (1) in the same manner as in step 73, which is illustrated in FIG. 11. Then, the transmission system control circuit 42 sets the calculated transmission amplitude value to the transmission circuit 15 via the amplitude adjustment decoder 44.

In step 94, the transmission system control circuit 42 transmits transmission state information from the transmission circuit 15. Here, the transmission circuit 15 transmits the transmission state information at the transmission amplitude value determined in step 93.

In step 95, the transmission system control circuit 42 receives via the reception circuit 13 the reception state information (i.e., the reception amplitude value and the operation state of the equalizer 23a) that relates to the reception state of the reception circuit 23 in the second node 20.

In step 96, the transmission system control circuit 42 determines whether the reception circuit 23 is capable of receiving the signal transmitted from the transmission circuit 15. When determining that the reception circuit 23 is incapable of receiving the signal (NO), the transmission system control circuit 42 proceeds to step 97.

In step 97, the transmission system control circuit 42 determines whether or not the transmission amplitude value of the transmission circuit 15 is unequal to the maximum value. If the transmission amplitude value of the transmission circuit 15 is equal to the maximum value (NO), the transmission amplitude value is not increasable. Further, the equalizer 23a of the reception circuit 23 is activated. Thus, the transmission system control circuit 42 determines that coupling is not performable because the reception performance of the reception circuit 23 is not increasable. Accordingly, the transmission system control circuit 42 stops communication. If the transmission amplitude value of the transmission circuit 15 is not the maximum value (YES), the transmission system control circuit 42 proceeds to step 98.

In step 98, the transmission system control circuit 42 increases the present set value for the transmission amplitude value of the transmission circuit 15 by an adjustment amount and then proceeds to step 94. If it is determined in step 96 that the reception circuit 23 is capable of receiving the signal from the transmission circuit 15 (YES), the transmission system control circuit 42 proceeds to step 99.

In step 99, the transmission system control circuit 42 inactivates the equalizer 23a of the reception circuit 23 in the second node 20. Next, in step 100, the transmission system control circuit 42 transmits the transmission state information from the transmission circuit 15. In step 101, the transmission system control circuit 42 receives via the reception circuit 13 the reception state information (i.e., the reception amplitude value and the operation state of the equalizer 23a) that relates to the reception state of the reception circuit 23 in the second node 20.

In step 102, the transmission system control circuit 42 determines whether the reception circuit 23 is capable of receiving the signal transmitted from the transmission circuit 15 based on the reception state information. In step 99, the transmission system control circuit 42 inactivates the equalizer 23a in the reception circuit 13 of the reception-side node (second node 20). When determining that the reception circuit 23 is capable of receiving the signal, the reception performance of the reception circuit 23 is not further decreasable. Thus, the transmission system control circuit 42 ends the optimization process.

If it is determined in step 102 that the reception circuit 23 is incapable of receiving the signal from the transmission circuit 15, the transmission system control circuit 42 proceeds to step 103. In step 103, the transmission system control circuit 42 transmits the state code TCC from the transmission circuit 15 and activates the equalizer 23a of the reception circuit 23 in the second node 20. That is, the transmission system control circuit 42 returns the reception circuit 23 in the second node 20 to the state in which it could receive the signal from the transmission circuit 15 in step 96. Then, the transmission system control circuit 42 ends the optimization process.

In addition to the advantages of the first embodiment, the second embodiment has the advantages described below.

(1) The adjustment circuits 14a and 24a in the nodes 10 and 20 activate the equalizers 13a and 23a in the reception circuits 13 and 23 and then process communication environment setting. Accordingly, even under a poor communication environment, signals transmitted from the transmission circuits 15 and 25 are receivable by the reception circuits 13 and 23. This ensures that the communication environment setting is processed.

(2) The adjustment circuits 14a and 24a process the communication environment setting after the equalizers 13a and 23a are activated. Accordingly, there is no need to check the states of the equalizers 13a and 23a. This shortens the processing time. Further, the time from when the nodes 10 and 20 are coupled to each other to when communication becomes possible is also shortened.

Third Embodiment

A third embodiment will now be described. To avoid redundancy, like or same reference numerals are given to those components that are the same as the corresponding components of the above embodiments. Such components will not be described in detail.

The third embodiment has the same network configuration and the same device configuration as the first embodiment.

In the third embodiment, the adjustment circuits 14a and 24a in the nodes 10 and 20 process the adjustment of the reception circuits 13 and 23 separately from the adjustment of the transmission circuits 15 and 25. For example, the adjustment circuits 14a and 24a in the nodes 10 and 20 first set the equalizers 13a and 23a and then adjust the amplitude of the transmission circuits 15 and 25. The process for setting the equalizers 13a and 23a and the process for adjusting the amplitude of the transmission circuits 15 and 25 may be performed in different states.

First, the reception circuit 23 in the second node 20 is adjusted.

More specifically, the adjustment circuit 14a in the first node 10 transmits a transmission signal with, for example, the maximum amplitude from the transmission circuit 15 of the same first node 10. The reception circuit 23 in the second node 20 detects the amplitude of the signal with the amplitude detector 23b and transmits reception state information (state code RCC) including the detected amplitude value.

When receiving the state code RCC, the adjustment circuit 14a controls activation and inactivation of the equalizer 23a of the peer node (second node 20) based on the reception amplitude value in the state code RCC. For example, the second node 20 transmits a reception result of a transmission signal that is transmitted under a certain operation condition (e.g., the maximum amplitude) and received when controlling activation of the equalizer 23a, and a reception result of the transmission signal received when controlling inactivation of the equalizer 23a.

The adjustment circuit 14a in the first node 10 controls the equalizer 23a in the second node 20 based on the two reception results. For example, a difference between the reception amplitude values in the two reception results is calculated. The difference in the two reception amplitude values corresponds to the operation state of the equalizer 23a. For example, the difference between the amplitude value of the signal received when the equalizer 23a is activated and the amplitude value of the signal received when the equalizer 23a is inactivated corresponds to a loss in the transmission path 30. Accordingly, the adjustment circuit 14a determines the activation and inactivation of the equalizer 23a based on the loss in the transmission path 30. Then, the adjustment circuit 14a transmits transmission state information (state code TCC) to the second node 20 via the transmission circuit 15 in order to obtain the determined state of the equalizer 23a. In response to the received transmission state information, the adjustment circuit 24a in the second node 20 controls the activation and inactivation of the equalizer 23a.

Next, the reception circuit 13 in the first node 10 is adjusted.

More specifically, the adjustment circuit 24a in the second node 20 transmits a transmission signal with, for example, the maximum amplitude from the transmission circuit 25 in the same second node 20. The reception circuit 13 in the first node 10 detects the amplitude of the signal with the amplitude detector 13b and transmits the reception state information (the state code RCC) including the detected amplitude value. When receiving the state code RCC, the adjustment circuit 24a determines activation and inactivation of the equalizer 13a based on the reception result. Then, the adjustment circuit 24a transmits transmission state information (state code TCC) to the first node 10 via the transmission circuit 25 to obtain the determined state of the equalizer 13a. In response to the received transmission state information, the adjustment circuit 14a in the first node 10 activates or inactivates the equalizer 13a.

Next, the nodes 10 and 20 adjust the transmission amplitude values of the transmission circuits 15 and 25.

Figure 15:
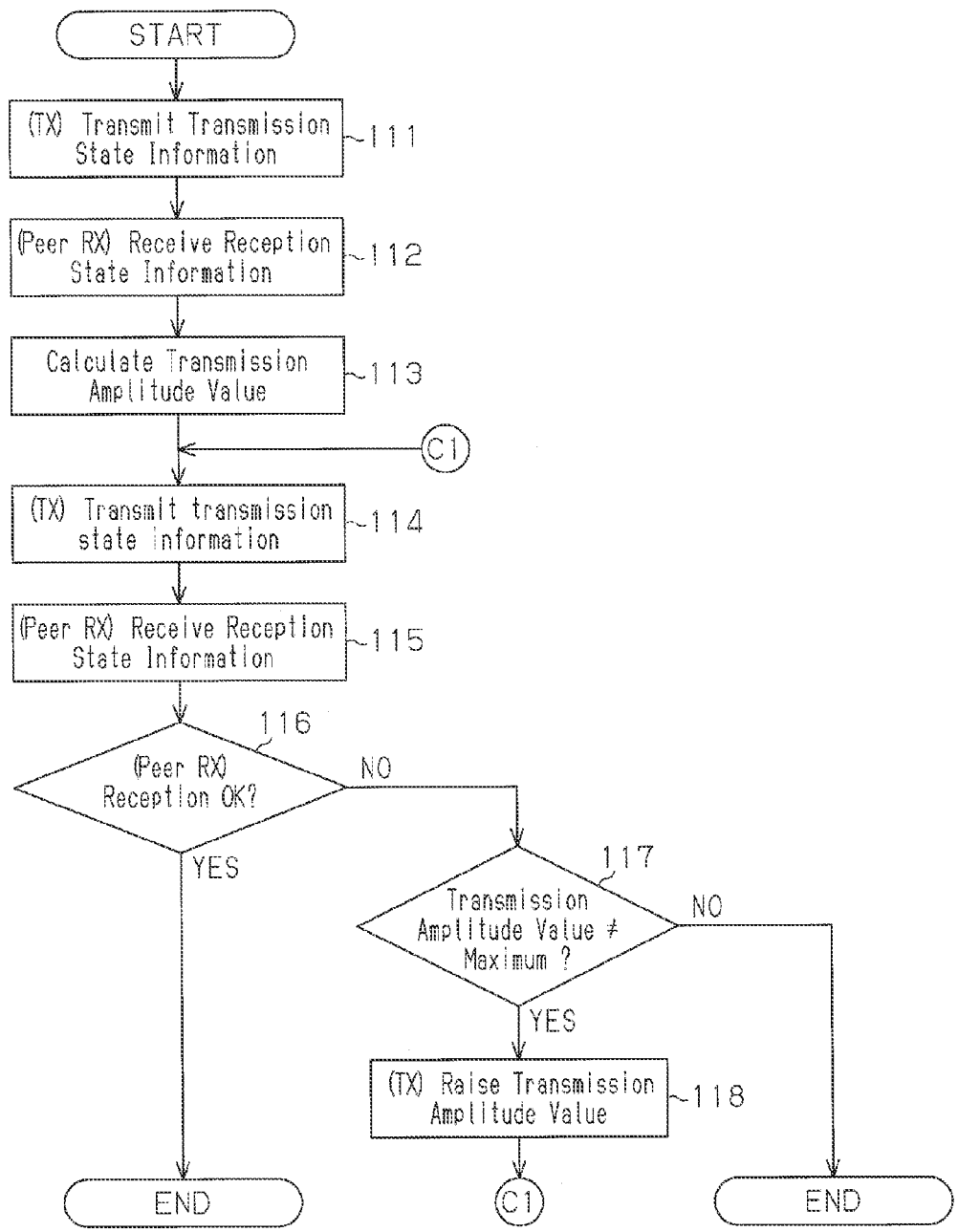
FIG. 15 is a flowchart illustrating an adjustment process in a third embodiment.

Referring to FIG. 15, in step 111, the transmission system control circuit 42 in the first node 10 transmits the transmission state information (state code TCC) from the transmission circuit 15. The second node 20 receives the signal from the transmission circuit 15 in the first node 10 with the reception circuit 23 and transmits the reception state information that relates to the reception result from the transmission circuit 25.

Next, in step 112, the transmission system control circuit 42 receives via the reception circuit 13 the reception state information (a reception amplitude value) that corresponds to the reception state of the reception circuit 23 in the second node 20.

In step 113, the transmission system control circuit 42 calculates the transmission amplitude value of the transmission circuit 15 with equation (1). Then, the transmission system control circuit 42 sets the calculated transmission amplitude value to the transmission circuit 15 via the amplitude adjustment decoder 44. In step 114, the transmission system control circuit 42 transmits the transmission state information to the transmission circuit 15. In this case, the transmission circuit 15 transmits the transmission state information at the transmission amplitude value set in step 113.

In step 115, the transmission system control circuit 42 receives via the reception circuit 13 the reception state information (the reception amplitude value) that relates to the reception state of the reception circuit 23 in the second node 20. In step 116, the transmission system control circuit 42 determines whether or not the reception circuit 23 is capable of receiving the signal transmitted from the transmission circuit 15. When determining that the reception circuit 23 is capable of receiving the signal (YES), the transmission system control circuit 42 ends the optimization process. When determining that the reception circuit 23 is incapable of receiving the signal (NO), the transmission system control circuit 42 proceeds to step 117.

In step 117, the transmission system control circuit 42 determines whether or not the transmission amplitude value of the transmission circuit 15 is equal to the maximum value. When the transmission amplitude value of the transmission circuit 15 is equal to the maximum value (NO), the transmission amplitude value is not increasable. Further, the equalizer 23a of the reception circuit 23 is activated. Thus, the transmission system control circuit 42 determines that coupling is not performable because the reception performance of the reception circuit 23 is not increasable. Accordingly, the transmission system control circuit 42 stops communication. When the transmission amplitude value of the transmission circuit 15 is not the maximum value (YES), the transmission system control circuit 42 proceeds to step 118. In step 118, the transmission system control circuit 42 increases the transmission amplitude value of the transmission circuit 15 from the present set value by an adjustment step and proceeds to step 114.

In addition to the advantages of the first embodiment, the third embodiment has the advantages described below.

(1) The adjustment circuits 14a and 24a in the nodes 10 and 20 perform the setting of the equalizers 13a and 23a separately from the adjustment of the transmission amplitude values of the transmission circuits 15 and 25. Accordingly, the adjustments may be performed at any timing.

Fourth Embodiment

A fourth embodiment will now be described. To avoid redundancy, like or same reference numerals are given to those components that are the same as the corresponding components of the above embodiments. Such components will not be described in detail.

The fourth embodiment has the same network configuration and the same device configuration as the first embodiment.

Figure 16:
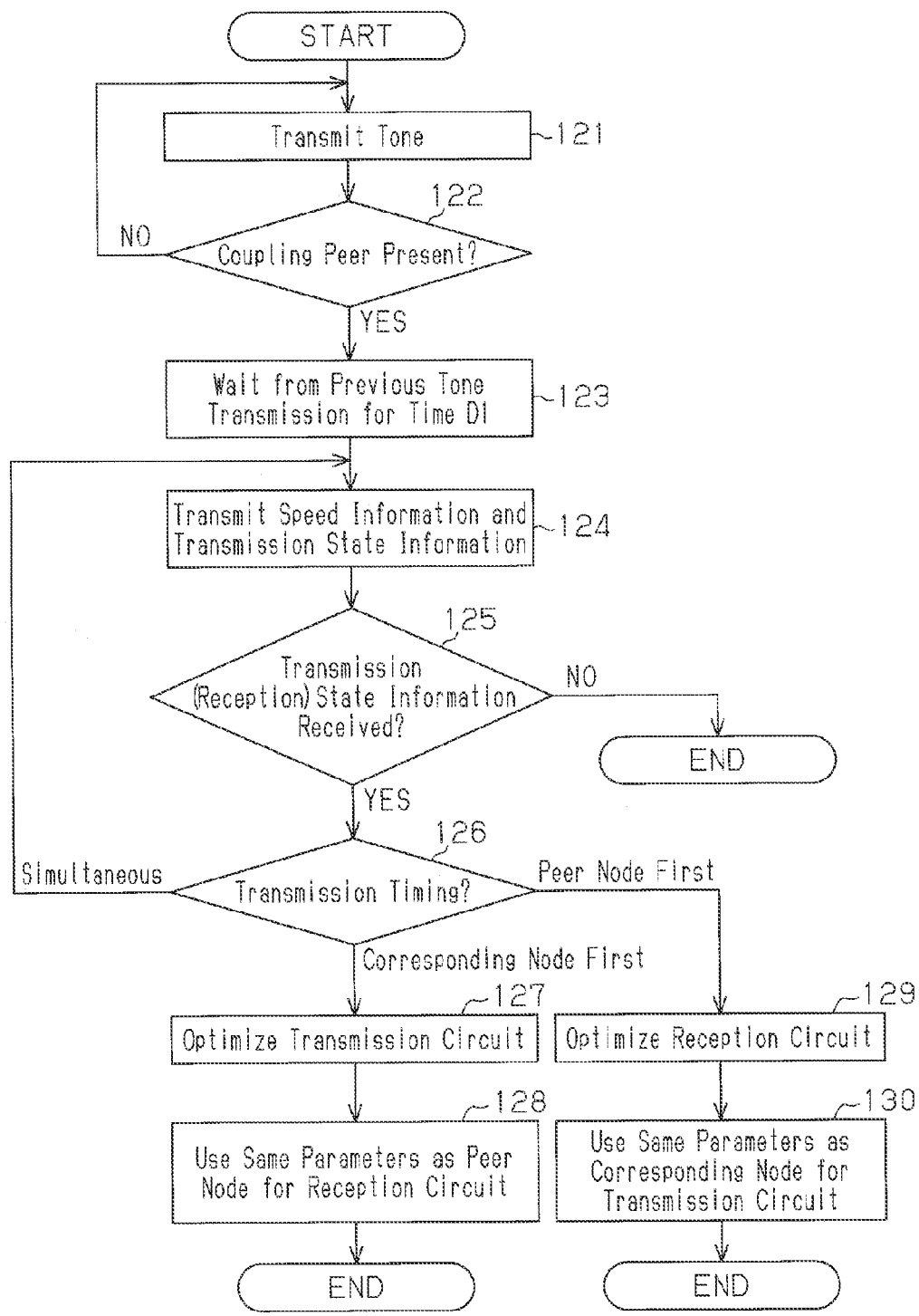
FIG. 16 is a schematic flowchart illustrating an adjustment process in a fourth embodiment.

The nodes 10 and 20 shown in FIG. 2 perform circuit optimization in accordance with steps 121 to 130 illustrated in FIG. 16.

The transmission system control circuit 42 shown in FIG. 3 performs steps 121 to 126 that are respectively the same steps 51 to 56 of FIG. 5.

When the transmission system control circuit 42 determines in step 126 that its corresponding node is first, the transmission system control circuit 42 performs step 127 and then performs in step 128. Here, the adjustment circuit 24a in the second node 20 determines that the peer node is first and performs step 129 and then step 130.

In step 127, the transmission system control circuit 42 in the first node 10 performs the same process as that of step 57 illustrated in FIG. 7 to optimize the transmission circuit 15. Here, the adjustment circuit 24a (more specifically, the reception system control circuit 45) in the peer node, namely, the second node 20, optimizes the reception circuit 23. Next, in step 128, the reception system control circuit 45 in the second node 20 makes the state of a reception circuit 13 (e.g., the operation state of the equalizer 13a) become the same as the state of the reception circuit 23 in the second node 20 and ends the optimization process. The second node 20 sets the transmission amplitude value of the transmission circuit 25 and the operation of the de-emphasis circuit 25a in its node based on the transmission state information (state code TCC) transmitted from the first node 10 and ends the optimization process.

In step 129, a path from the transmission circuit 25 to the reception circuit 13 is optimized. That is, the second node 20 optimizes the transmission circuit 25, and the first node 10 optimizes the reception circuit 13. Then, the processing proceeds to step 130. In step 130, the transmission system control circuit 42 in the first node 10 makes the state of the transmission circuit 15 (e.g., the transmission amplitude value of the transmission circuit 15 and the ON/OFF of the de-emphasis circuit 15a) become the same as the reception circuit 23 in the second node 20 and ends the optimization process. The second node 20 uses the same setting as the first node 10 (e.g., the operation state of the equalizer 13a) for the reception circuit 23 of its corresponding node.

As illustrated in FIG. 2, the first node 10 and the second node 20 are coupled to each other by the transmission path 30. A signal transmitted from the first node 10 is transferred to the second node 20 by the transmission path 30. A signal transmitted from the second node 20 is transferred to the first node 10 by the transmission path 30. Accordingly, the signal transmitted from the node 10 or 20 is transmitted to the peer node 20 or 10 through a common transfer environment that is referred to as the transmission path 30. Therefore, a loss in the received signal in the second node 20 with respect to the transmission signal from the first node 10 is equal to a loss in the received signal in the first node 10 with respect to the transmission signal from the second node 20. This is because cables, connectors, and substrates in the transmission path 30 are linked in pairs to the peer nodes so that the two nodes 10 and 20 have the same characteristics unless they have significantly different circuit characteristics. Accordingly, by optimizing the next path using the optimization results of the previous path, the time required for the optimization process may be reduced.

In addition to the advantages of the first embodiment, the fourth embodiment has the advantages described below.

(1) The adjustment circuits 14a and 24a in the nodes 10 and 20 adjust the reception circuit and the transmission circuit in one path and then set the reception circuit and the transmission circuit in the next path based on the adjustment results. Accordingly, the time required for adjustment of the second path may be shortened. Further, the time required from when the nodes 10 and 20 are coupled to each other to when communication becomes possible may be shortened.

Fifth Embodiment

A fifth embodiment will now be described. To avoid redundancy, like or same reference numerals are given to those components that are the same as the corresponding components of the above embodiments. Such components will not be described in detail.

The fifth embodiment has the same network configuration and the same device configuration as the first embodiment.

When starting processing in the third state ST3 (refer to FIG. 4), namely, the communication environment setting, the nodes 10 and 20 illustrated in FIG. 2 perform processing in steps 141 to 169 illustrated in FIGS. 17 to 20 and optimizes the circuits.

Figure 17:
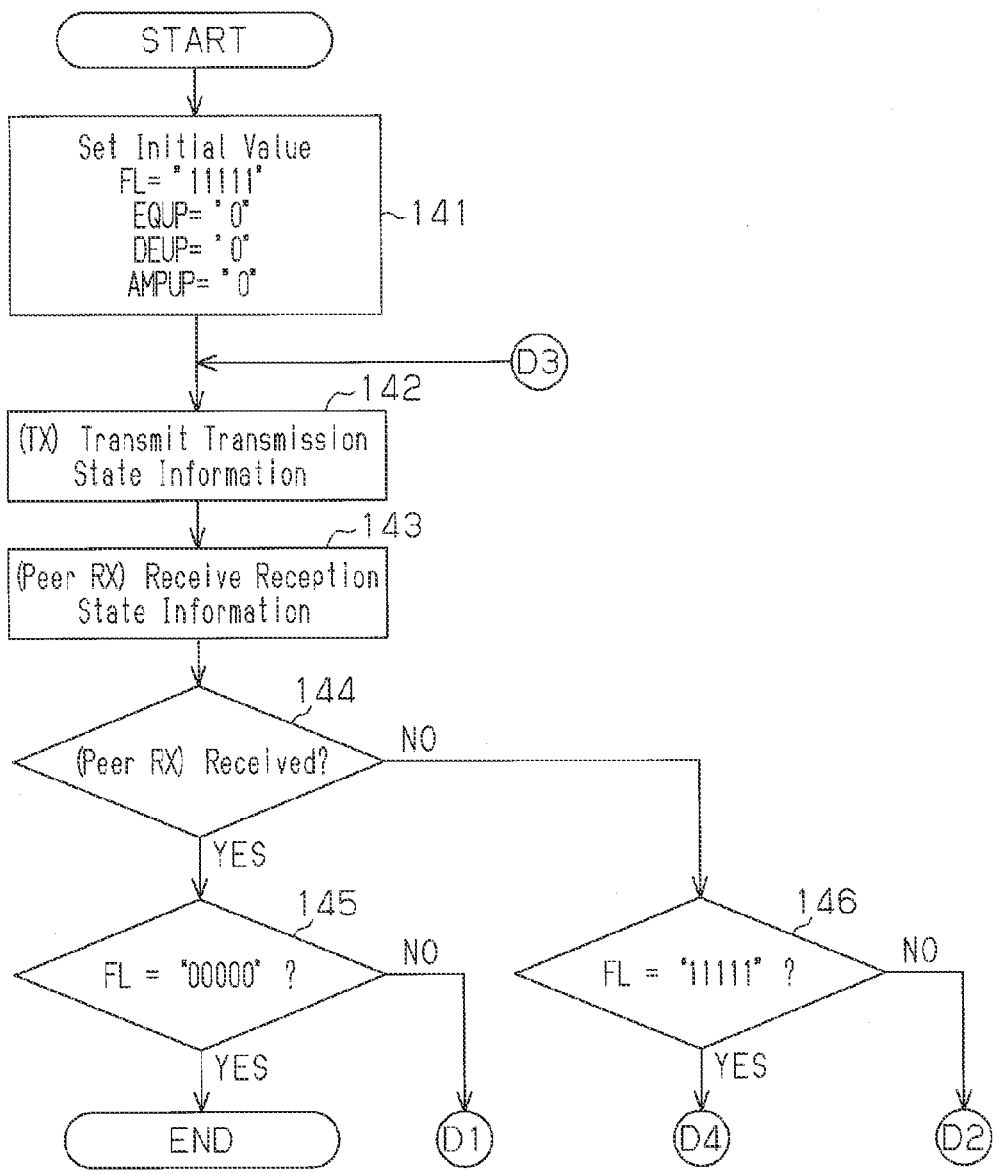
FIG. 17 is a flowchart illustrating an adjustment process in a fifth embodiment.

First, in step 141, which is illustrated in FIG. 17, the physical logic unit 14 sets initial values for the reception circuit 13 and the transmission circuit 15 in the register 41a. The initial values include, for example, a state flag FL, which indicates the state of the reception circuit 23 in the peer node (here, the second node 20) and the state of the transmission circuit 15 in its corresponding node (here, the first node 10), and three control flags EQUP, DEUP, and AMPUP. The state flag FL is, for example, five-bit data, and each of the control flags EQUP, DEUP, and AMPUP is, for example, one-bit data.

The most significant bit (MSB) of the state flag FL indicates the operation state of an equalizer 23a in the second node 20. The second bit of the state flag FL indicates the operation state of the de-emphasis circuit 15a in the transmission circuit 15 of the first node 10. A bit string of the third bit to the least significant bit (LSB, the fifth bit) of the state flag FL indicates the transmission amplitude value of the transmission circuit 15 in the first node 10.

In one example, the initial value of the state flag FL is "11111". That is, in the initial state, the equalizer is ON, the de-emphasis circuit is ON, and the transmission amplitude value of the transmission circuit 15 is the maximum value (800 mV). In the processing of the initial value setting, the adjustment circuits 14a and 24a in the nodes 10 and 20 respectively activate the equalizers 13a and 23a in the reception circuits 13 and 23 and the de-emphasis circuits 15a and 25a in the transmission circuits 15 and 25. Further, in the processing of the initial value setting, the adjustment circuits 14a and 24a in the nodes 10 and 20 respectively set the transmission amplitude values of the transmission circuits 15 and 25 to the maximum value.

The reception system control circuit 45 in each of the nodes 10 and 20 set the control flag EQUP to "1" or "0". The transmission system control circuit 42 in the nodes 10 and 20 set the control flags DEUP and AMPUP to "1" or "0".

The initial value of "0" is set for each of the control flags EQUP, DEUP, and AMPUP. When the equalizer 23a is activated, "1" is set for the control flag EQUP. When the de-emphasis circuit 15a is activated, "1" is set for the control flag DEUP. When the transmission amplitude value of the transmission circuit 15 becomes greater than the present value, "1" is set for the control flag AMPUP. The control flags EQUP, DEUP, and AMPUP are provided to prevent the optimization process from entering an endless loop.

Next, in step 142, the transmission circuit 15 transmits the transmission state information (state code TCC).

In step 143, the reception circuit 13 receives the reception state information (i.e., the reception amplitude value and the operation state of the equalizer 23a) that indicates the reception state in the reception circuit 23 in the second node 20.

In step 144, the transmission system control circuit 42 determines whether the reception circuit 23 is capable of receiving a signal transmitted from the transmission circuit 15. When determining that the reception circuit 23 is capable of receiving the signal (YES), the transmission system control circuit 42 proceeds to step 145. When determining that the reception circuit 23 is incapable of receiving the signal (NO), the transmission system control circuit 42 proceeds to step 146.

In step 145, the transmission system control circuit 42 determines whether the state flag FL stored in the register 41a is "00000". The state flag FL of "00000" indicates that the equalizer 13a is inactivated, the de-emphasis circuit 15a is inactivated, and the transmission amplitude value of the transmission circuit 15 is the minimum value. Further, the state flag FL of "00000" indicates that a reception performance of the reception circuit 13 and a transmission performance of the transmission circuit 15 is not decreasable. Thus, the transmission system control circuit 42 ends the optimization process.

Figure 18:
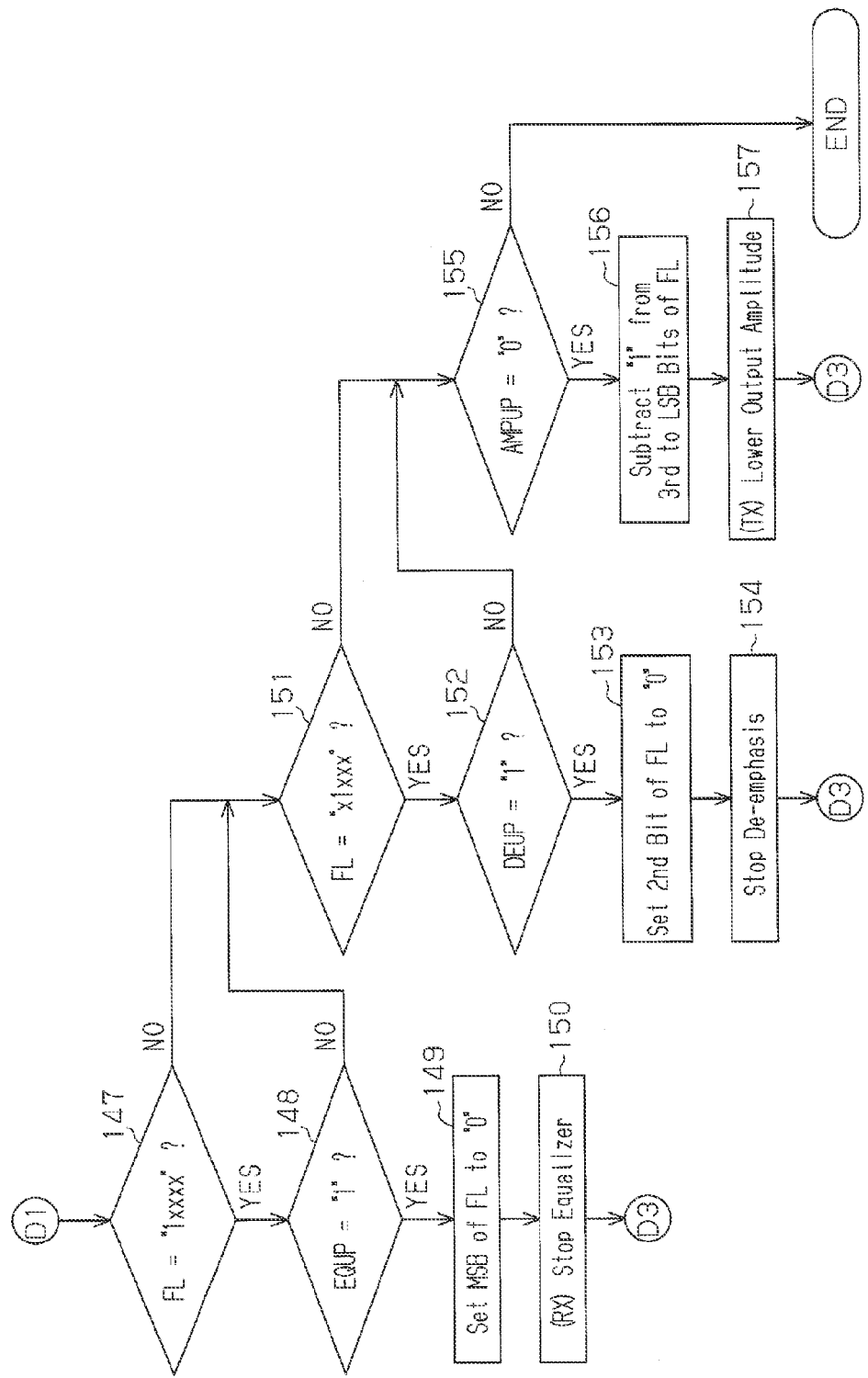
FIG. 18 is a flowchart illustrating the adjustment process in the fifth embodiment.

When the state flag FL in the first node 10 is not "00000" in step 145 (NO), the transmission system control circuit 42 proceeds to step 147, which is illustrated in FIG. 18.

In step 147, the transmission system control circuit 42 determines whether or not the MSB of the state flag FL is "1". Here, it is determined whether or not the equalizer 23a in the reception circuit 23 of the second node 20 is activated. When the MSB of the state flag FL is "1" (YES), the processing proceeds to step 148.

In step 148, the transmission system control circuit 42 determines whether or not the control flag EQUP is "0". Here, it is determined whether or not the equalizer 23a has ever been activated. When the control flag EQUP is "0" (YES), the processing proceeds to step 149.

In step 149, the transmission system control circuit 42 sets the MSB of the state flag FL to "0" with the flag control circuit 41. Next, in step 150, the transmission system control circuit 42 inactivates the equalizer 23a in the reception circuit 23 of the second node 20. Then, the transmission system control circuit 42 proceeds to step 142, which is illustrated in FIG. 17.

When the MSB of the state flag FL is "0" (NO) in step 146, the transmission system control circuit 42 proceeds to step 151.

Further, when the control flag EQUP is 1 (NO) in step 148, the transmission system control circuit 42 proceeds to step 151.

In step 151, the transmission system control circuit 42 determines whether or not the second bit of the state flag FL is "1". Here, it is determined whether or not the de-emphasis circuit 15a is activated. When the second bit of the state flag FL is "1" (YES), the processing proceeds to step 152.

In step 152, the transmission system control circuit 42 determines whether or not the control flag DEUP is 0. Here, it is determined whether or not the de-emphasis circuit 15a has ever been activated. When the control flag DEUP is "0" (YES), the processing proceeds to step 153.

In step 153, the transmission system control circuit 42 sets the second bit of the control flag FL to "0" with the flag control circuit 41. Next, the transmission system control circuit 42 inactivates the de-emphasis circuit 15a. Then, the transmission system control circuit 42 proceeds to step 142, which is illustrated in FIG. 17.

When the second bit of the state flag FL is "0" (NO) in step 151, the transmission system control circuit 42 proceeds to step 155. Further, when the control flag DEUP is "1" (NO) in step 152, the processing proceeds to step 155.

In step 155, the transmission system control circuit 42 determines whether or not the control flag AMPUP is 0. Here, it is determined whether or not the transmission amplitude value of the transmission circuit 15 has ever been raised. When the control flag AMPUP is "1" (NO), the optimization process ends. When the control flag AMPUP is "0" (YES), the processing proceeds to step 156.

In step 156, the transmission system control circuit 42 subtracts "1" from the third bit to the LSB bit of the state flag FL with the flag control circuit 41. Next, in step 157, the transmission system control circuit 42 lowers the transmission amplitude value of the transmission circuit 15 from the present value. Then, the transmission system control circuit 42 proceeds to step 142, which is illustrated in FIG. 17.

When determining in step 144, which is illustrated in FIG. 17, that the reception circuit 13 is incapable of receiving the signal transmitted from the transmission circuit 15 (NO), the transmission system control circuit 42 proceeds to step 146.

In step 146, the transmission system control circuit 42 determines whether the state flag FL is "11111". Here, it is determined whether or not the transmission and reception performance is not increasable. When the state flag FL is not "11111" (NO), the processing proceeds to step 158, which is illustrated in FIG. 19.

In step 158, the transmission system control circuit 42 determines whether the lower three bits of the state flag FL are not "111". Here, it is determined whether or not the transmission amplitude value of the transmission circuit 15 is not the maximum value. When the lower three bits of the state flag FL are not "111" (YES), the processing proceeds to step 159.

In step 159, the transmission system control circuit 42 sets the control flag AMPUP to "1" with the flag control circuit 41 and adds "1" to the lower three bits of the state flag FL. Next, in step 160, the transmission system control circuit 42 raises the transmission amplitude value of the transmission circuit 15 from the present value. Then, the transmission system control circuit 42 proceeds to step 142, which is illustrated in FIG. 17.

Figure 19:
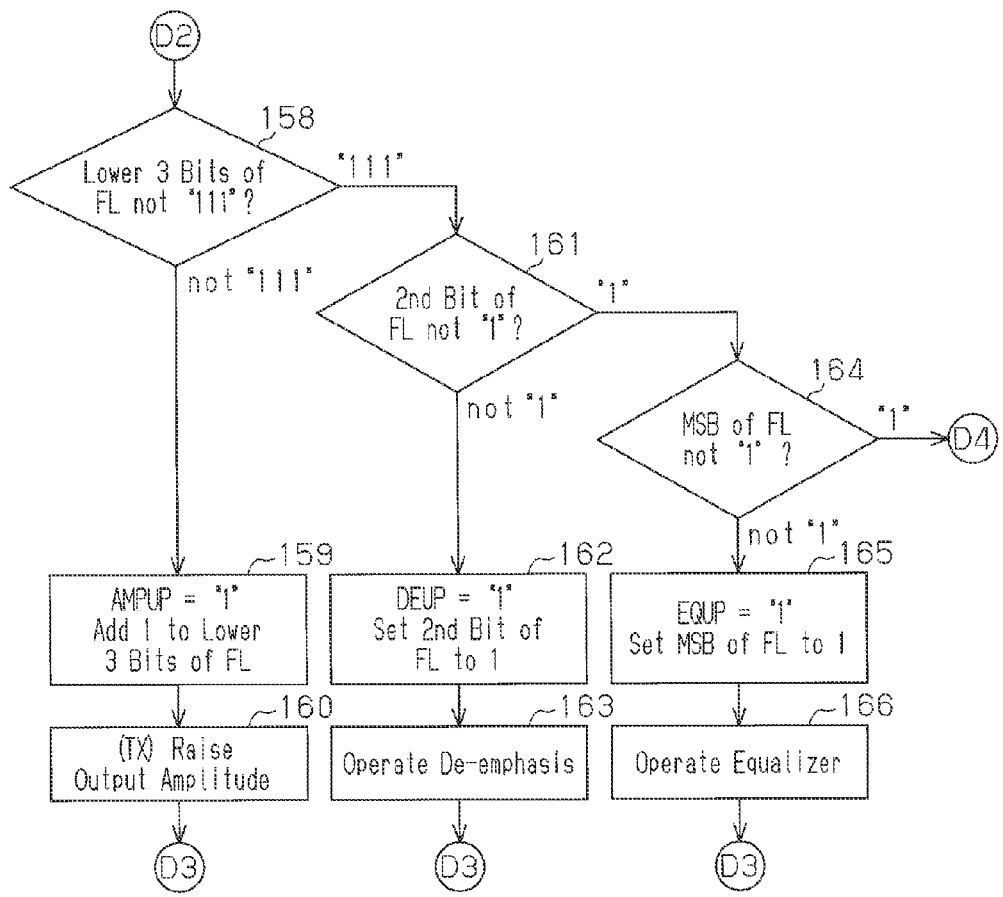
FIG. 19 is a flowchart illustrating the adjustment process in the fifth embodiment.

When the lower three bits of the state flag FL are "111" (NO) in step 158, which is illustrated in FIG. 19, the transmission system control circuit 42 proceeds to step 161.

In step 161, the transmission system control circuit 42 determines whether or not the second bit of the state flag FL is not "1". Here, it is determined whether or not the de-emphasis circuit 15*a* is inactivated. When the de-emphasis circuit 15*a* is inactivated (YES), the transmission system control circuit 42 proceeds to step 162.

In step 162, the transmission system control circuit 42 sets the control flag DEUP to "1" and the second bit of the state flag FL to "1" with the flag control circuit 41. Next, in step 163, the transmission system control circuit 42 activates the de-emphasis circuit 15*a*. Then, the transmission system control circuit 42 proceeds to step 142, which is illustrated in FIG. 17.

When the second bit of the state flag FL is "1" (NO) in step 161, the transmission system control circuit 42 proceeds to step 164.

In step 164, the transmission system control circuit 42 determines whether the MSB of the state flag FL is not "1". Here, it is determined whether or not the equalizer 23*a* is inactivated. When the MSB of the state flag FL is not "1" (YES), the processing proceeds to step 165.

In step 165, the transmission system control circuit 42 sets the control flag EQUP to "1" and the MSB of the state flag FL to "1" with the flag control circuit 41. Next, in step 166, the transmission system control circuit 42 activates the equalizer 23*a* in the reception circuit 23 of the second node 20. Then, the transmission system control circuit 42 proceeds to step 142, which is illustrated in FIG. 17.

Figure 20:
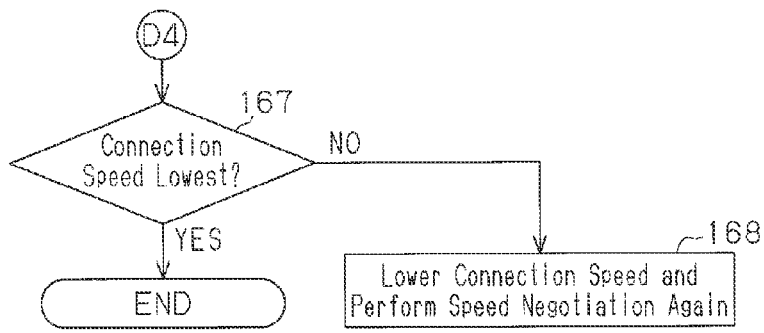
FIG. 20 is a flowchart illustrating the adjustment process in the fifth embodiment.

When the state flag FL is "11111" (YES) in step 146, which is illustrated in FIG. 17, the transmission system control circuit 42 proceeds to step 168, which is illustrated in FIG. 20.

Further, if the MSB of the state flag FL is "1" in step 165, which is illustrated in FIG. 19, the transmission system control circuit 42 proceeds to step 168, which is illustrated in FIG. 20.

In step 168, the transmission system control circuit 42 determines whether or not the connection speed is the lowest. When the connection speed is the lowest, the transmission system control circuit 42 determines that coupling is not performable and stops communication. When the connection speed is not the lowest, the processing proceeds to step 168.

In step 168, the transmission system control circuit 42 lowers the connection speed and performs speed negotiation again. More specifically, the transmission system control circuit 42 sets a speed code (speed code TSC) to lower the communication speed negotiated with the peer node (i.e., the second node 20 in the fifth embodiment) and transmits the speed code TSC and the state code TCC to the peer node from the transmission circuit 25.

In addition to the advantages of the first embodiment, the fifth embodiment has the advantages described below.

(1) The adjustment circuits 14*a* and 24*a* in the nodes 10 and 20 gradually change the amplitude of the transmission signals transmitted from the transmission circuits 15 and 25. Accordingly, the transmission amplitude values of the transmission circuits 15 and 25 may be adjusted, and power consumption may be reduced.

It should be apparent to those skilled in the art that the present invention may be embodied in many other specific forms without departing from the spirit or scope of the invention. Particularly, it should be understood that the present invention may be embodied in the following forms.

The reference value in the above embodiments may be set as required. For example, the reference value may be set to a value (e.g., 100 mV) that is less than the lowest reception amplitude value (200 mV), which is specified by the standard, in accordance with the configurations of the reception circuits 13 and 23.

The priority order of the parameters of the optimized circuit may be changed in accordance with circuit or purpose. For example, to reduce electromagnetic noise, priority may be given to reduction of the transmission amplitude value of the transmission circuit by operating the equalizer in the reception circuit. When the equalizer is of a high function digital type and consumes more power than the transmission circuit, priority is given to stopping the equalizer.

In state ST3 that performs the speed negotiation illustrated in FIG. 4, adjustment processing for optimizing the reception circuits 13 and 23 and the transmission circuits 15 and 25 in the nodes 10 and 20 is performed in the above embodiments. The adjustment processing may be performed in a state that differs from the state in which speed negotiation is performed. The state for performing the adjustment processing may be prior to or subsequent to the state for performing the speed negotiation. Further, the adjustment processing may be performed once or more times after the state ST4 for synchronization.

In each of the above embodiments, the reception circuits 13 and 23 and the transmission circuits 15 and 25 are optimized. However, the optimization of the reception circuits 13 and 23 and the optimization of the transmission circuits 15 and 25 are performed in different states. Further, optimization of the transmission circuits 15 and 25 may be eliminated.

In each of the above the embodiments, the processing order may be changed as required. For example, in the processes illustrated in FIGS. 11 to 13, when the equalizer 23*a* is confirmed to be activated, the equalizer 23*a* may be inactivated. Then, the transmission amplitude value of the transmission circuit 15 may be changed. By performing processing in such a manner, priority may be given to the inactivation of the equalizers 13*a* and 23*a* in the reception circuits 13 and 23 to reduce power consumption in the reception circuits 13 and 23.

In the fifth embodiment, the step for changing the amplitude of the transmission signal may be variable. For example, the step may be 100 mV in an initial stage and the changing width may be gradually reduced (for example, by 50 mV) in accordance with the reception amplitude value.

In the fifth embodiment, the step in which to change the amplitude value of the transmission signal may be changed corresponding to the reception amplitude value. For example, if the reception amplitude value with respect to the transmission signal transmitted at the maximum amplitude is a certain value (for example, at least 400 mV), the step in which to change the transmission amplitude value may be changed to 100 mV, and the step in which to change the transmission amplitude value when the reception amplitude value is smaller than a certain value may be changed to the minimum value (for example, 50 mV). This increases a step in which to change the transmission amplitude value in a good reception state environment, to reduce the number of times of adjusting the amplitude value, thereby enabling adjusting the transmission signal amplitude in a short lapse of time.

In the first embodiment, when determining in step 83 (see FIG. 12) that the reception circuit is incapable of receiving a signal, the transmission system control circuit 42 activates the equalizer 23a in step 84. Alternatively, the transmission amplitude of the transmission circuit 15 may be changed (increased in this case) while keeping the equalizer 23a inactivated. In such a manner, the power consumption of the reception-side reception circuit may be reduced. Further, by adjusting the transmission amplitude of the transmission side, the power consumption of the transmission circuit 15 may be reduced.

In the above embodiments, the process for calculating the transmission amplitude value of the transmission circuit 15 (equation (1) used in step 73 of FIG. 11) is only one example and may be changed when required. For example, the set transmission amplitude value may be calculated so that the difference between the transmission amplitude value and the reception amplitude value is equal to the difference between the transmission amplitude value set next and the reference value. This obtains the same advantages as the above embodiments.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication device, which communicates with another communication device, comprising:
   a transmission circuit that transmits a transmission signal under a first transmission condition;
   a reception circuit that receives a reception result of the transmission signal under a first reception condition and the first reception condition; and
   an adjustment circuit that transmits first information from the transmission circuit to the another communication device, based on the reception result and the first reception condition before changing the first transmission condition to a second transmission condition in which power consumption of the communication device is less than that in the first transmission condition, the first information allowing the another communication device to adjust the first reception condition to a second reception condition in which power consumption of the another communication device is less than that in the first reception condition.

2. The communication device according to claim 1, wherein
   a reception circuit of a reception-side communication device that receives the transmission signal under the first reception condition includes an amplification circuit that amplifies a signal within a certain band of received signals, and
   the adjustment circuit adds second information that controls the amplification circuit to the first information.

3. The communication device according to claim 1, wherein
   the transmission circuit transmits the transmission signal to the another communication device coupled to the communication device at a transmission amplitude that corresponds to the transmission condition,
   the reception result includes a reception amplitude of the transmission signal received by the another communication device under the first reception condition, and
   the adjustment circuit adjusts the amplitude based on the transmission amplitude of the transmission signal and the reception amplitude.

4. The communication device according to claim 3, wherein
   the transmission circuit is set with a first amplitude value,
   the adjustment circuit calculates a second amplitude value based on the first amplitude value set for the transmission circuit, a reception amplitude value corresponding to the reception amplitude, and a reference value, and
   the adjustment circuit sets the second amplitude value to the transmission circuit.

5. The communication device according to claim 4, wherein the adjustment circuit calculates the second amplitude value so that the reception amplitude value becomes equal to the reference value.

6. The communication device according to claim 1, wherein
   the transmission circuit includes a waveform shaping circuit that shapes a waveform of a transmission signal, and
   the adjustment circuit controls an operation state of the waveform shaping circuit in accordance with the reception result.

7. The communication device according to claim 1, wherein the adjustment circuit transmits the transmission signal and the first information during a transmission state that transmits a speed code used to set a speed at which the communication device and the another communication device communicate with each other.

8. The communication device according to claim 7, wherein
   the transmission circuit repeatedly transmits a tone signal in a certain cycle, and
   the adjustment circuit transmits the speed code and the first information in an interval between the tone signal and an immediately following tone signal.

9. The communication device according to claim 1, wherein the adjustment circuit transmits the transmission signal and the first information at a time before a period of synchronization state in which the reception circuit is synchronized with a received signal based on a synchronization signal.

10. A communication device, which communicates with another communication device, comprising:
    a reception circuit that receives a transmission signal transmitted from the another communication device under a first reception condition;
    a transmission circuit that transmits a reception result of the transmission signal received by the reception circuit and the first reception condition to the another communication device; and
    an adjustment circuit that adjusts the first reception condition to a second reception condition in which power consumption of the communication device is less than that in the first reception condition in response to a receipt notification transmitted from the another communication device based on the reception result and the first reception condition, before the another communication device changes a first transmission condition to a second transmission condition in which power consumption of the another communication device is less than that in the first transmission condition.

11. A communication system comprising first and second communication devices that are coupled to each other,
wherein the first communication device includes:
a first transmission circuit that transmits a transmission signal under a first transmission condition;
a first reception circuit that receives a reception result of the transmission signal under a first reception condition and the first reception condition; and
a first adjustment circuit that transmits first information from the transmission circuit to the second communication device, based on the reception result and the first reception condition before changing the first transmission condition to a second transmission condition in which power consumption of the first communication device is less than that in the first transmission condition, the first information allowing the second communication device to adjust the first reception condition to a second reception condition in which power consumption of the second communication device is less than that in the first reception condition; and
wherein the second communication device includes:
a second reception circuit that receives the transmission signal transmitted from the first communication device under the first reception condition;
a second transmission circuit that transmits the first reception condition and the reception result of the transmission signal received by the second reception circuit to the first communication device; and
a second adjustment circuit that adjusts the first reception condition of the second reception circuit to the second reception condition based on the reception result and the first reception condition in response to a receipt notification transmitted from the first communication device, before the first communication device changes the first transmission condition to the second transmission condition.

12. A communication method comprising:
transmitting a transmission signal under a first transmission condition from a transmission circuit of a communication device, which communicates with another communication device;
receiving, with a reception circuit of the communication device, a reception result of the transmission signal under a first reception condition and the first reception condition; and
transmitting first information from the transmission circuit to the another communication device, based on the reception result and the first reception condition before changing the first transmission condition to a second transmission condition in which power consumption of the communication device is less than that in the first transmission condition, the first information allowing the another communication device to adjust the first reception condition to a second reception condition in which power consumption of the another communication device is less than that in the first reception condition.

13. A method for adjusting a communication device, which communicates with another communication device, the method comprising:
receiving a transmission signal transmitted from the another communication device with a reception circuit of the communication device that operates under a first reception condition;
transmitting, from a transmission circuit of the communication device, the first reception condition and reception result of the transmission signal received by the reception circuit and to the another communication device; and
adjusting, with an adjustment circuit of the communication device, the first reception condition to a second reception condition in which power consumption of the communication device is less than that in the first reception condition in response to a receipt notification transmitted from the another communication device based on the reception result and the first reception condition, before the another communication device changes a first transmission condition to a second transmission condition in which power consumption of the another communication device is less than that in the first transmission condition.

* * * * *